(12) United States Patent
Charij

(10) Patent No.: US 9,460,589 B2
(45) Date of Patent: Oct. 4, 2016

(54) CASH REGISTER DRAWER SYSTEMS AND METHODS FOR DETERMINING CHANGES IN THE CONTENT OF CASH TRAYS

(71) Applicant: SMART DRAWER LTD., Reading (GB)

(72) Inventor: Peter G. Charij, Reading (GB)

(73) Assignee: SMART DRAWER LTD., Reading (GB)

( * ) Notice: Subject to any disclaimer, the term of this patent is extended or adjusted under 35 U.S.C. 154(b) by 35 days.

(21) Appl. No.: 14/386,598

(22) PCT Filed: Mar. 25, 2013

(86) PCT No.: PCT/GB2013/050767
§ 371 (c)(1),
(2) Date: Sep. 19, 2014

(87) PCT Pub. No.: WO2013/140186
PCT Pub. Date: Sep. 26, 2013

(65) Prior Publication Data
US 2015/0034398 A1    Feb. 5, 2015

(30) Foreign Application Priority Data

Mar. 23, 2012 (GB) .................................. 1205191.8
Mar. 8, 2013 (GB) .................................. 1304244.5

(51) Int. Cl.
*G07G 1/00* (2006.01)
*G07G 1/14* (2006.01)
(Continued)

(52) U.S. Cl.
CPC .......... *G07G 1/0027* (2013.01); *G01G 19/414* (2013.01); *G01G 19/42* (2013.01);
(Continued)

(58) Field of Classification Search
CPC .... G07G 1/0018; G07G 1/0027; G07G 1/14; G07G 3/006; G07D 9/002; G07D 9/004; G07D 9/02; G07D 9/04; G07D 11/0084; G06Q 20/20; G01G 19/414; G01G 19/4144; G01G 19/42; G01G 1/18; G01G 21/22; G01G 21/23; G01G 19/00; G01G 21/00
See application file for complete search history.

(56) References Cited

U.S. PATENT DOCUMENTS 2,314,387 A * 3/1943 Carlsson ............ G09B 19/0092
                                                    177/245
4,387,777 A * 6/1983 Ash ........................ G01G 19/40
                                                    177/1

(Continued)

FOREIGN PATENT DOCUMENTS

EP        0724242        7/1996
EP        1956562        8/2008

(Continued)

OTHER PUBLICATIONS

International Search Report and Written Opinion for International Application No. PCT/GB2013/050767, issued on Aug. 1, 2013 (priority claimed).

(Continued)

*Primary Examiner* — Randy W Gibson
(74) *Attorney, Agent, or Firm* — Howson & Howson, LLP

(57) ABSTRACT

A method and apparatus for the accurate detection of cash tokens being added and/or removed from a cash register or other cash holding device; that uses pre-knowledge of cash tokens to be added and/or removed from the device; a modified cash tray suspended via a lever mechanism, held in equilibrium against a force transducer; and a processing element to analyse the signal received from the transducer, comparing it against that pre-knowledge, for the purpose of generating or verifying a set of expected cash tokens being added and/or removed from the cash holding device.

20 Claims, 14 Drawing Sheets

(51) Int. Cl.
*G01G 19/414* (2006.01)
*G01G 19/42* (2006.01)
*G07D 9/02* (2006.01)
*G07D 11/00* (2006.01)
*G07G 3/00* (2006.01)
*G07D 9/00* (2006.01)
*G07D 9/04* (2006.01)

(52) U.S. Cl.
CPC ............ *G07G 1/0018* (2013.01); *G07G 1/14* (2013.01); *G07G 3/006* (2013.01); *G07D 9/002* (2013.01); *G07D 9/02* (2013.01); *G07D 9/04* (2013.01); *G07D 11/0084* (2013.01)

(56) References Cited

U.S. PATENT DOCUMENTS

| | | | | | |
|---|---|---|---|---|---|
| 4,447,885 | A | * | 5/1984 | Biss | G01G 19/414 177/200 |
| 4,512,428 | A | * | 4/1985 | Bullivant | G07D 9/04 177/1 |
| 4,522,275 | A | * | 6/1985 | Anderson | G01G 19/42 177/1 |
| 4,646,767 | A | * | 3/1987 | Hikita | G07D 9/04 177/200 |
| 5,193,629 | A | * | 3/1993 | Lare | G07D 9/04 177/200 |
| 5,750,937 | A | * | 5/1998 | Johnson | G01G 23/3707 177/199 |
| 5,756,977 | A | * | 5/1998 | Biss | G07G 1/0027 235/22 |
| 5,819,901 | A | * | 10/1998 | Filiberti | G01G 19/42 177/245 |
| 5,954,576 | A | * | 9/1999 | Coulter | G07D 9/04 177/25.17 |
| 6,176,774 | B1 | * | 1/2001 | Filiberti | G01G 19/42 177/245 |
| 7,992,768 | B2 | * | 8/2011 | Benigno | G01G 19/414 235/379 |
| 2003/0047603 | A1 | * | 3/2003 | Lustenberger | G01G 19/415 235/385 |
| 2003/0135406 | A1 | | 7/2003 | Rowe | |
| 2009/0236431 | A1 | | 9/2009 | Benigno | |
| 2010/0282520 | A1 | * | 11/2010 | Lucas | G01G 19/00 177/1 |

FOREIGN PATENT DOCUMENTS

| | | |
|---|---|---|
| GB | 2404768 | 2/2005 |
| GB | 2407194 | 4/2005 |
| GB | 2410363 | 7/2005 |
| GB | 2411035 | 8/2005 |
| GB | 2417093 | 2/2006 |
| JP | 04259097 | 9/1992 |
| JP | 2007/087052 | 4/2007 |
| JP | 2010-061560 | 3/2010 |
| WO | 2004/013818 A1 | 2/2004 |
| WO | WO 2005/106912 A1 | 11/2005 |

OTHER PUBLICATIONS

Search Report for United Kingdom Application No. GB1205191.8, issued on Jul. 12, 2012 (priority claimed).
Search Report for United Kingdom Application No. GB1304244.5, issued on Oct. 8, 2014 (priority claimed).
International Preliminary Report on Patentability for International Application No. PCT/GB2013/050767, issued Sep. 23, 2014 (priority claimed).

* cited by examiner

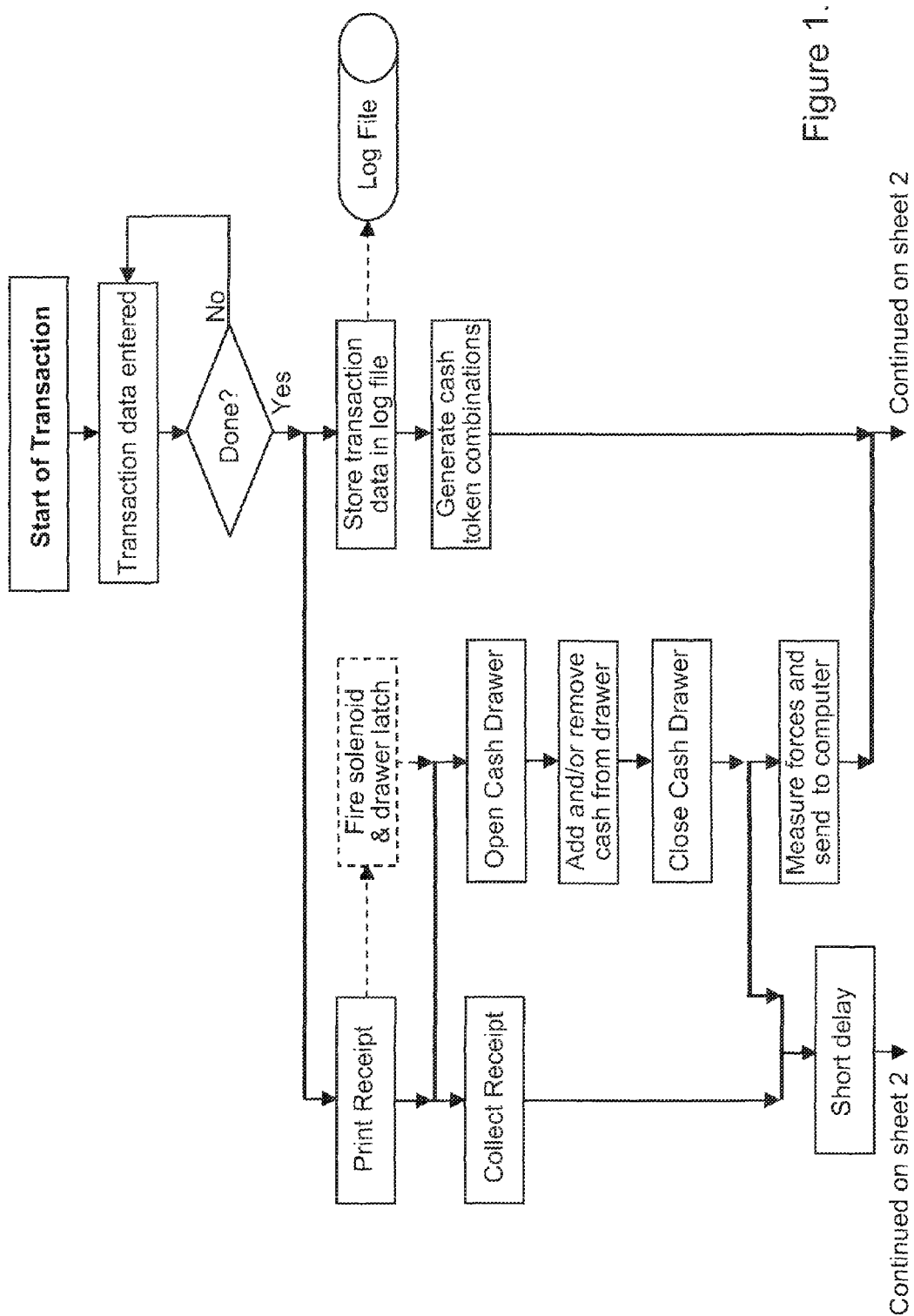
Figure 1.1

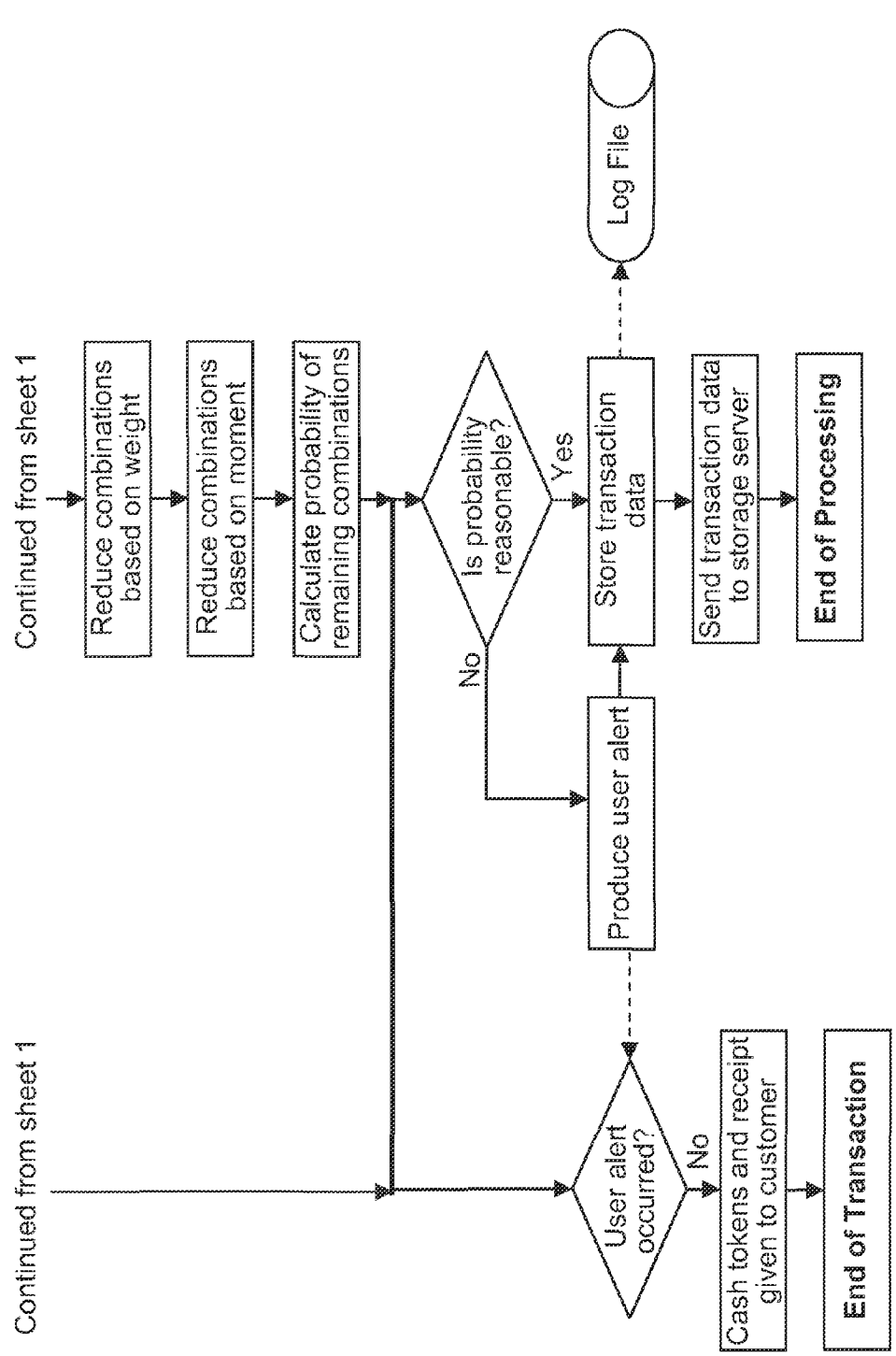

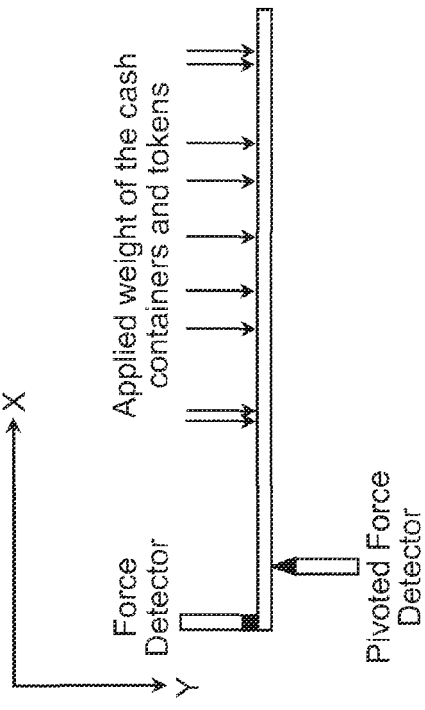
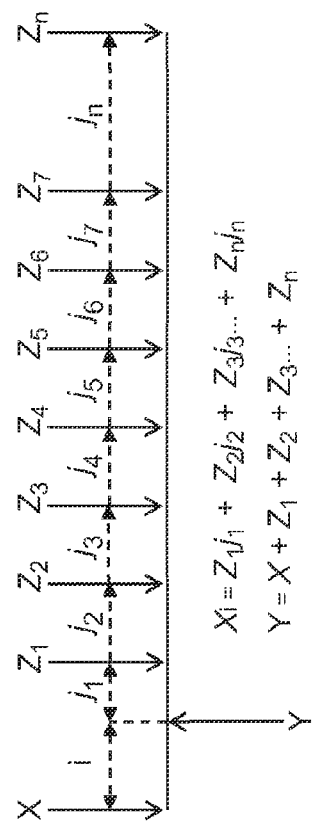
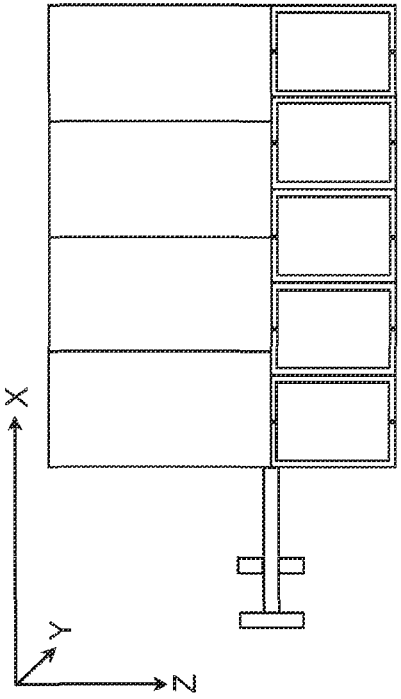
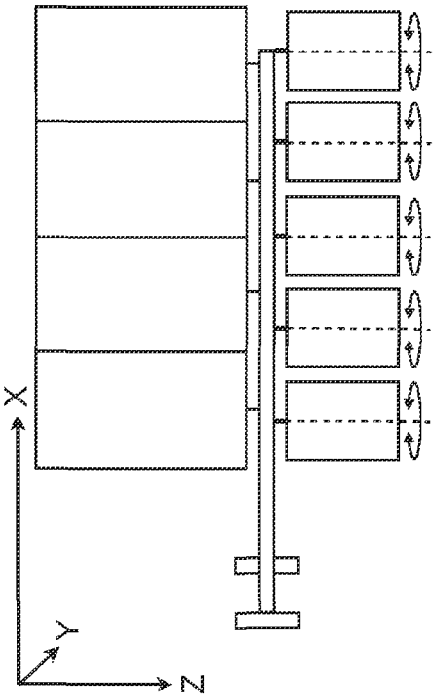
Figure 1.2

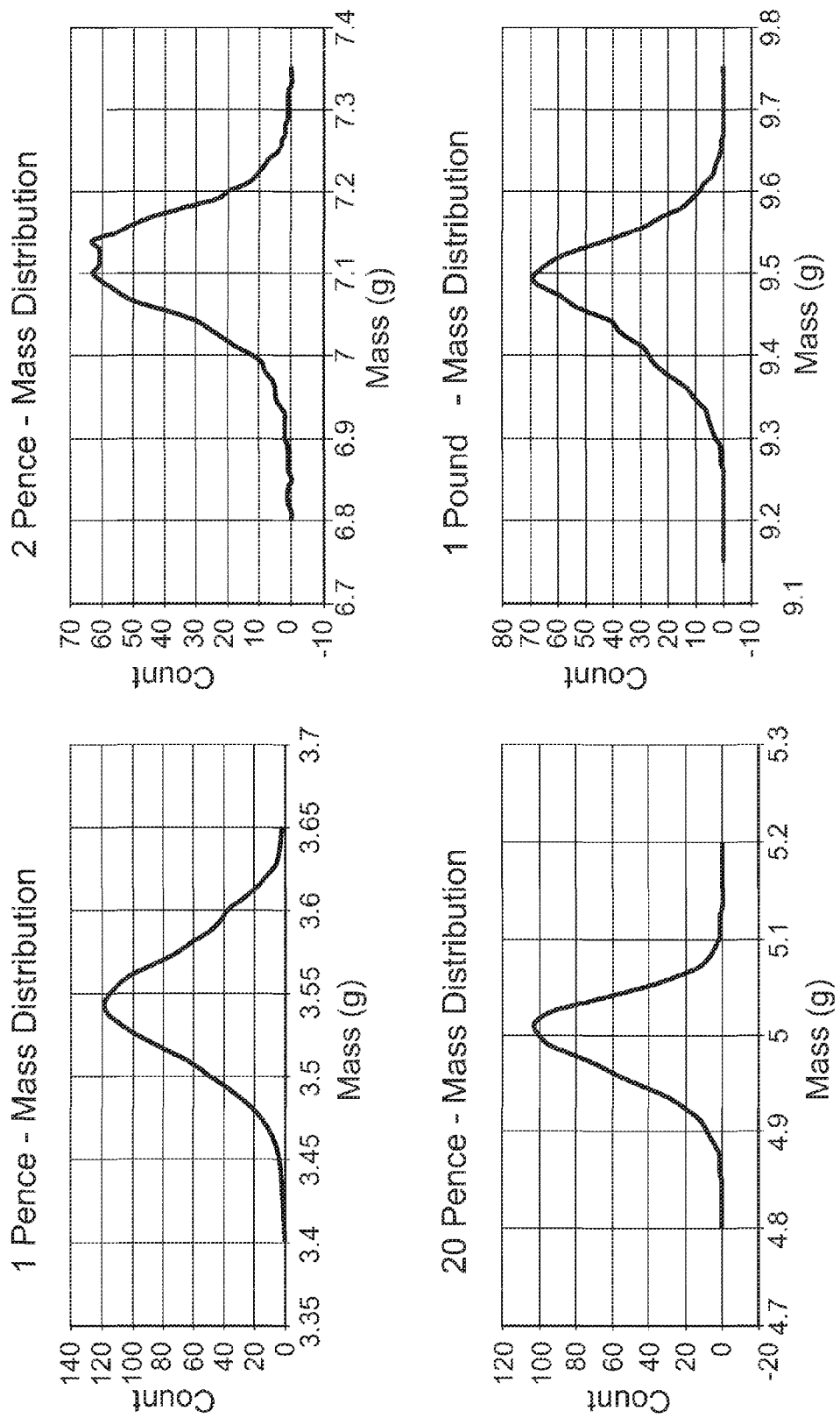
Figure 1.3

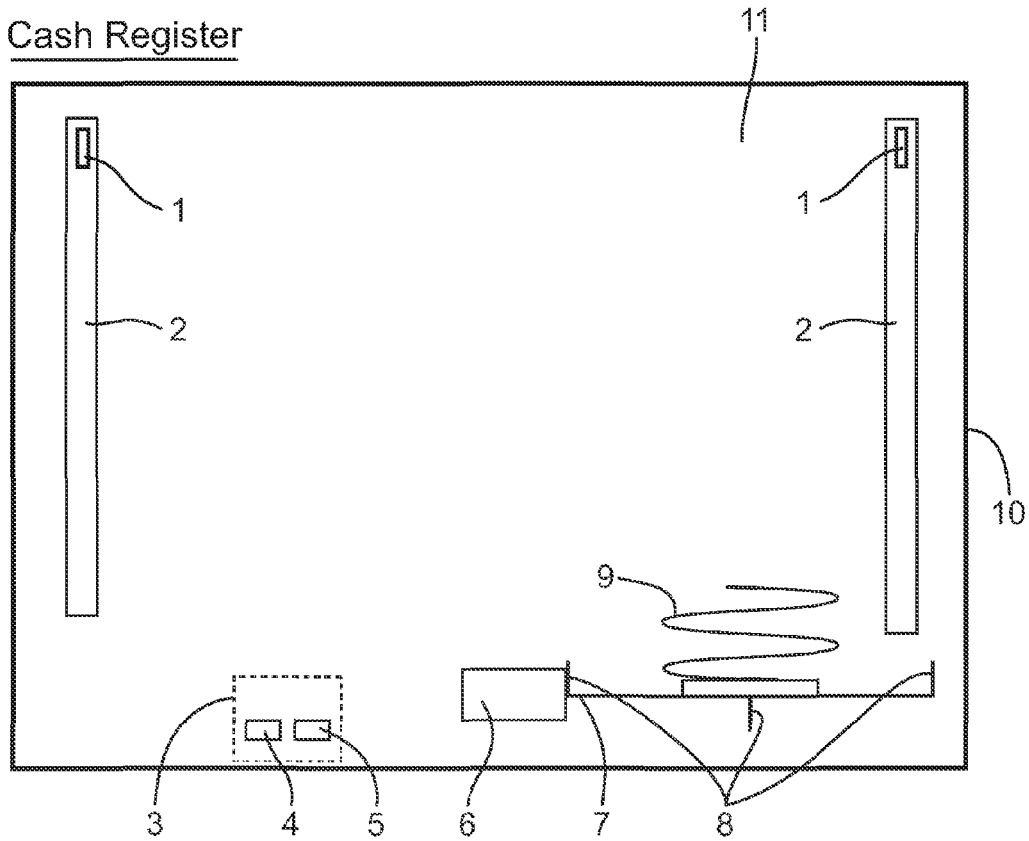

Cash Register

| | | |
|---|---|---|
| 1) Slider wheel | 15) Base of drawer | 29) Resting lip for tray |
| 2) Slider guide | 16) Pivot | 30) Side of tray |
| 3) Cable entry point | 17) Lever mechanism | 31) Cushion |
| 4) USB cable outlet | 18) Catch mechanism | 32) Back of tray |
| 5) DSL cable inlet | 19) Cushion | 33) Spring mechanism |
| 6) Solenoid & catch mechanism | 20) Wheel | 34) Cash note press |
| 7) Support spine | 21) Electronics | 35) Cash note container |
| 8) Prop | 22) Load cell (moment) | 36) Connection point for lever |
| 9) Spring mechanism | 23) Lever | 37) Coin container |
| 10) Casing | 24) Pivot point | 38) Pivot point |
| 11) Drawer | 25) Load cells (weight) | |
| 12) Slider guide | 26) Tray/lever attachment | |
| 13) Slide drawer | 27) Front Panel | |
| 14) Wheel | 28) Key/lock point | |

Figure 2.1

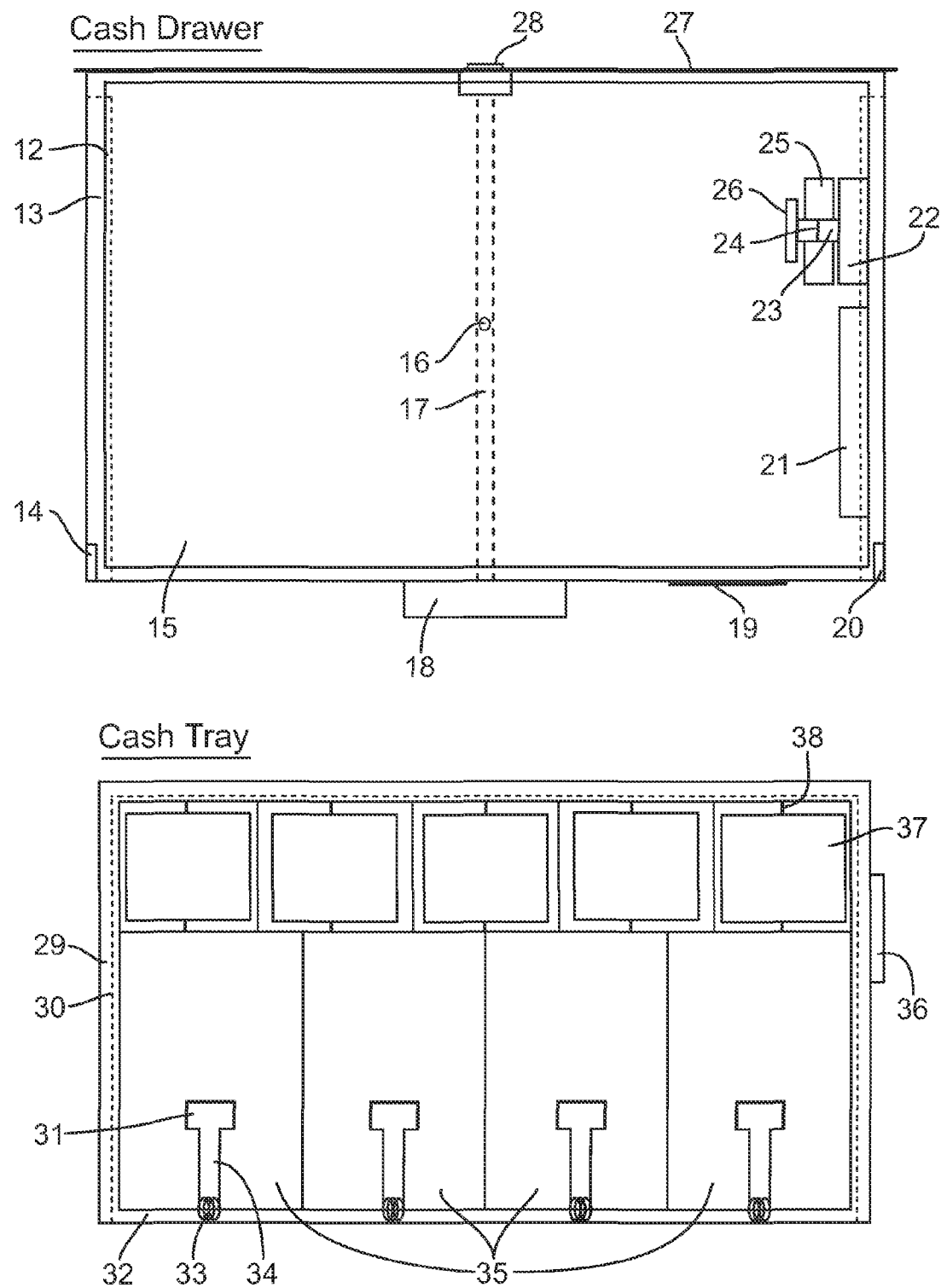
Figure 2.1 continued

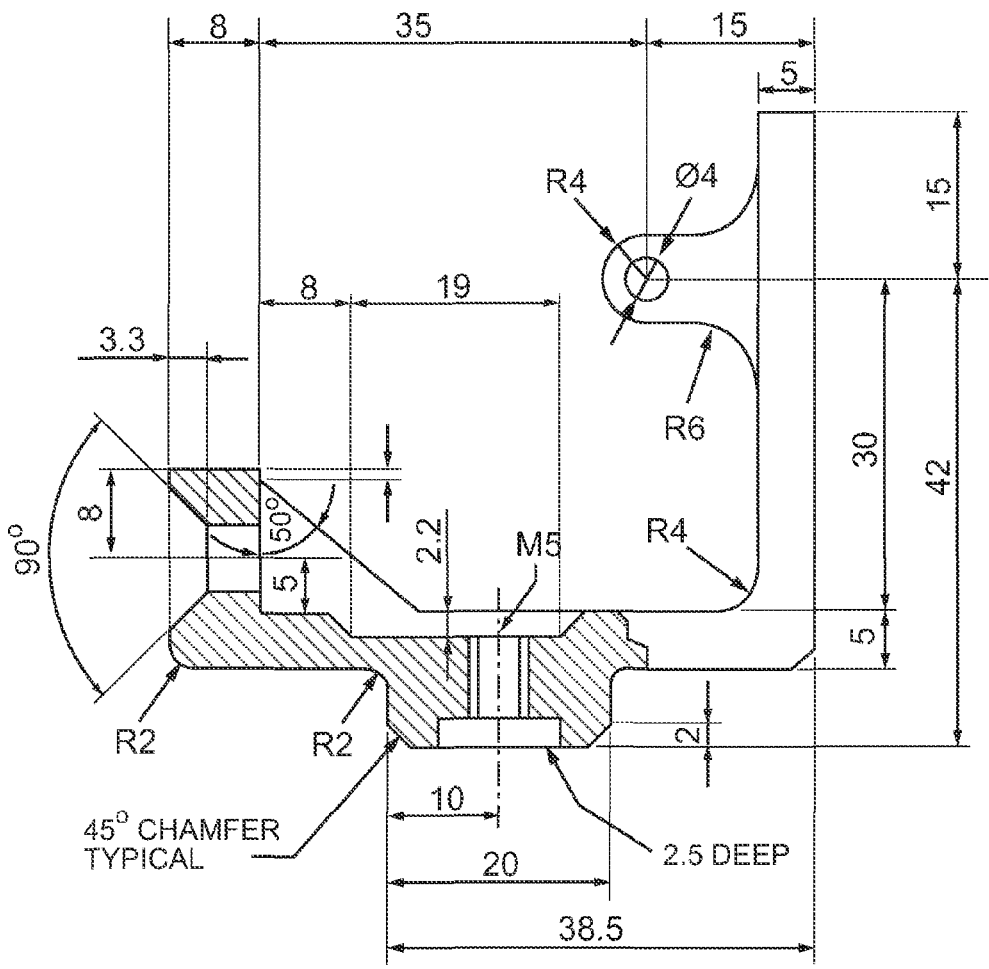
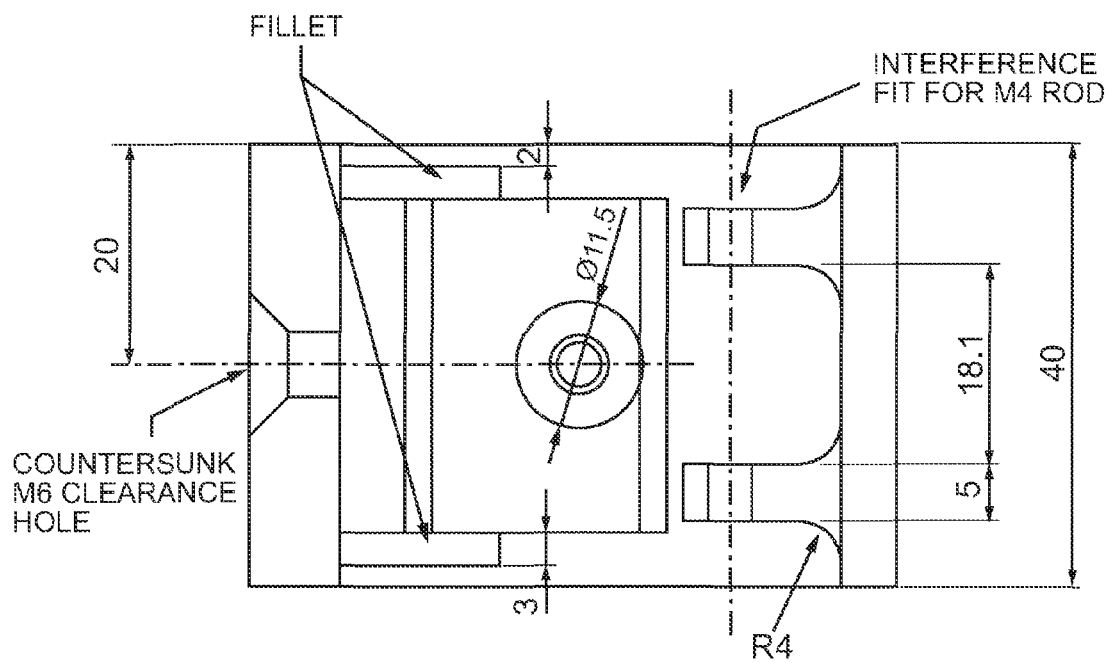
Figure 2.2

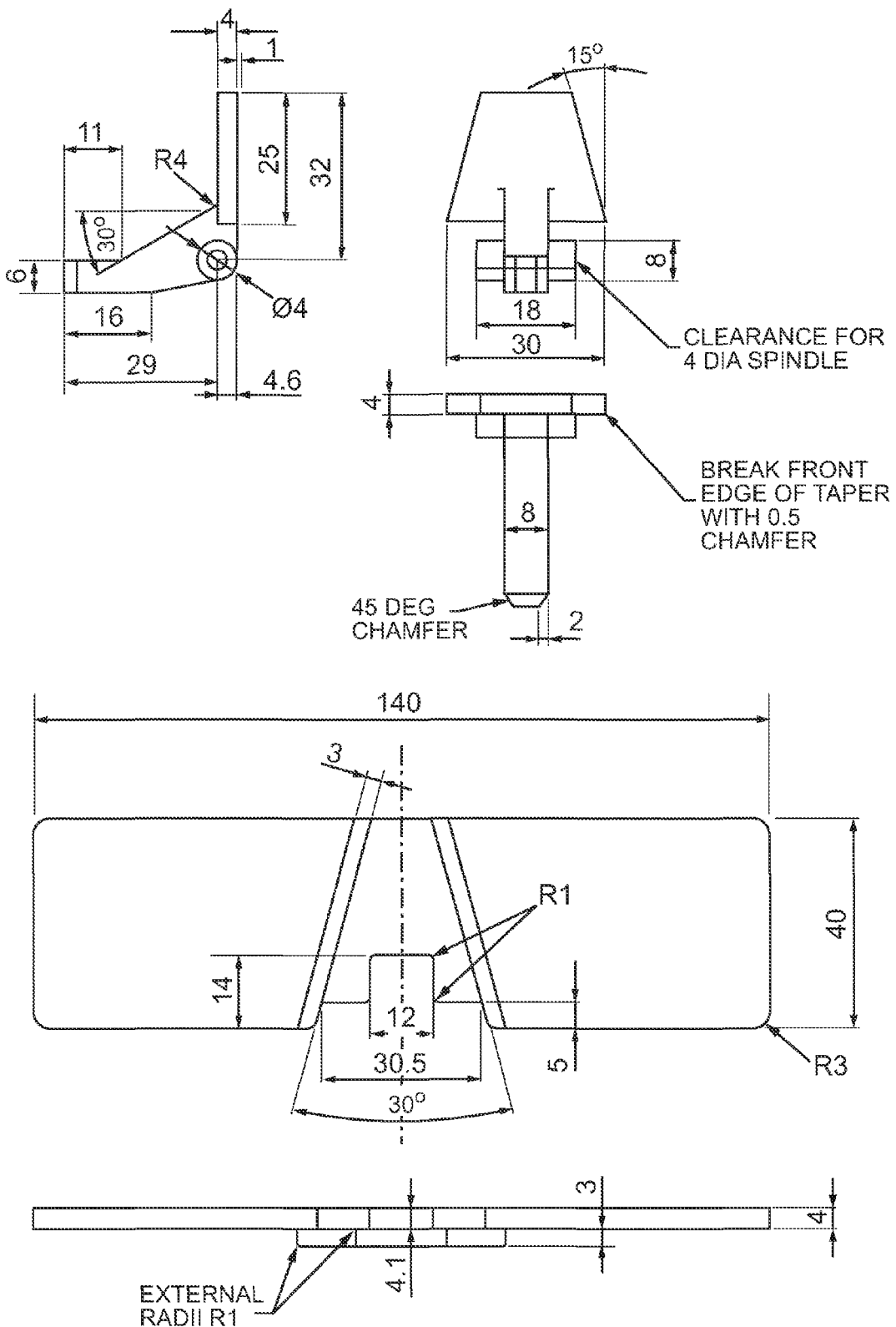
Figure 2.3

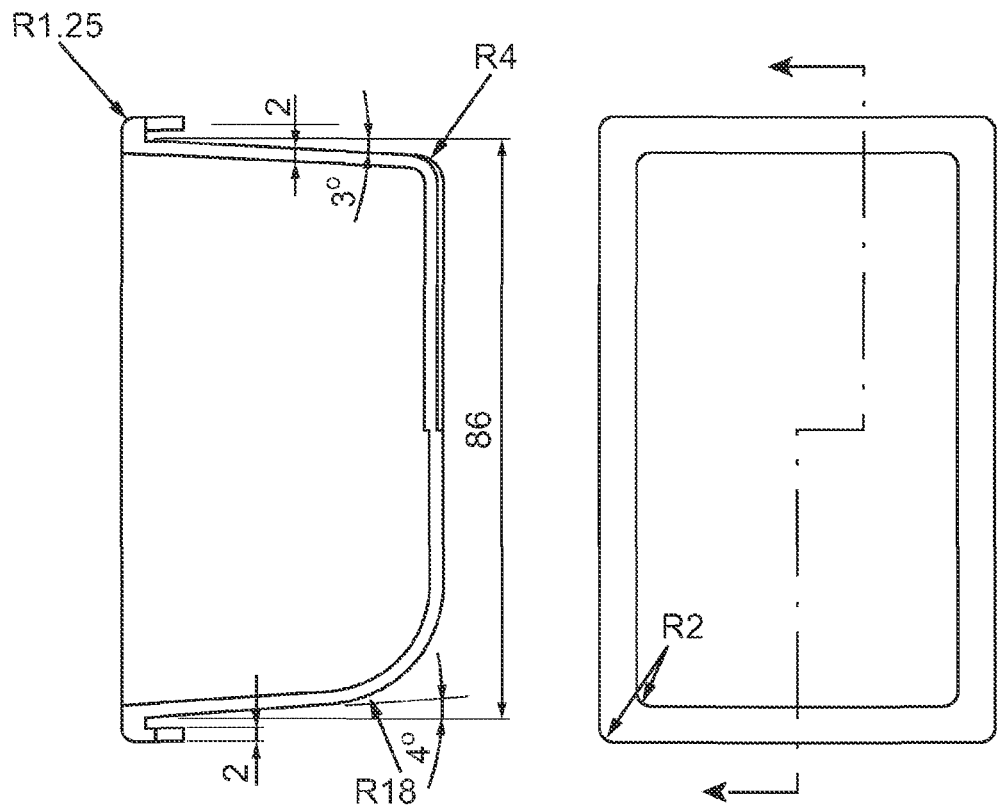
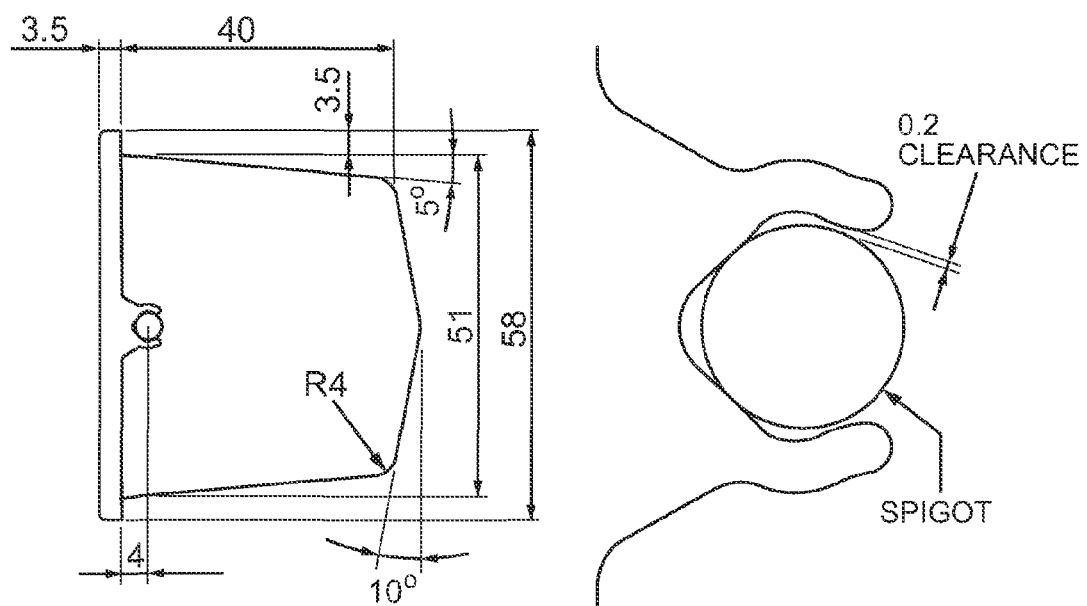
Fig. 2.4 Tray and container mechanism

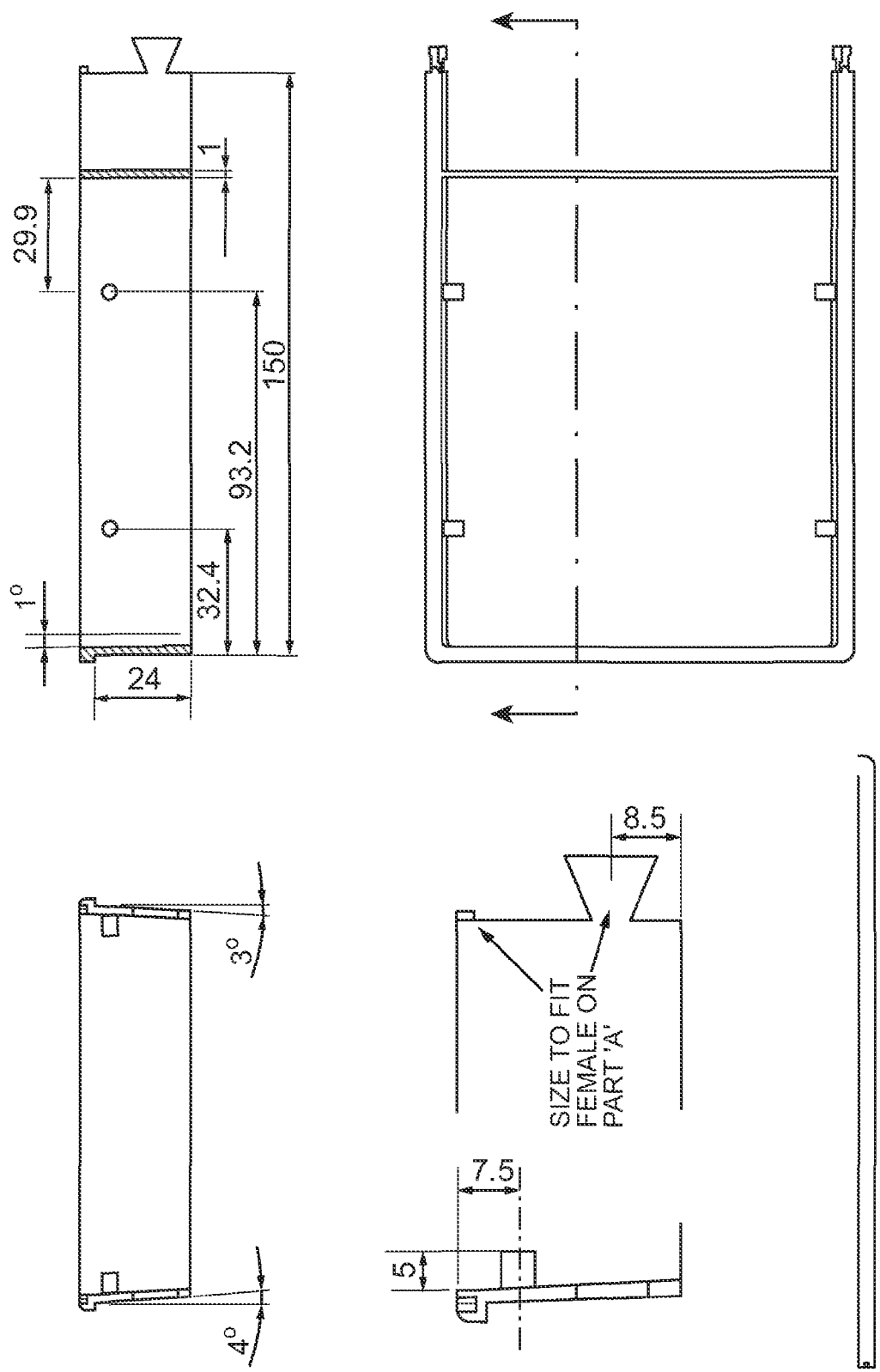
Fig. 2.4 Tray and container mechanism continued

Cash Register

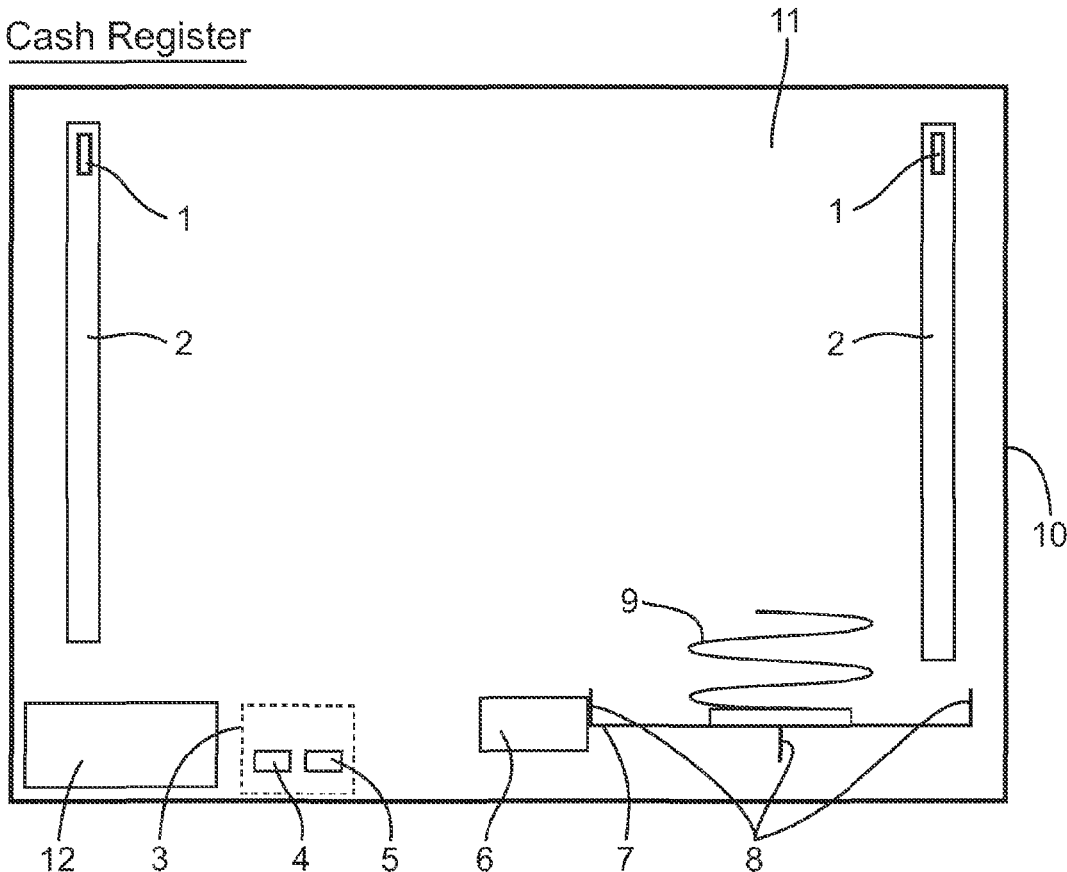

1) Slider wheel
2) Slider guide
3) Cable entry point
4) USB cable outlet
5) DSL cable inlet
6) Solenoid & catch mechanism
7) Support spine
8) Prop
9) Spring mechanism
10) Casing
11) Drawer
12) Electronics
13) Side of drawer
14) Wheel
15) Base of drawer
16) Pivot
17) Lever mechanism
18) Catch mechanism
19) Cushion
20) Wheel
21) Electronics
22) Load cell
23) Tray Guide
24) Back stop
25) Tray Guide
26) Load cell
27) Front Panel
28) Key/lock point
29) Resting lip for tray
30) Side of tray
31) Cushion
32) Back of tray
33) Spring mechanism
34) Cash note press
35) Cash note container
36) Connection point for lever
37) Coin container
38) Pivot point

Figure 5

Cash Drawer
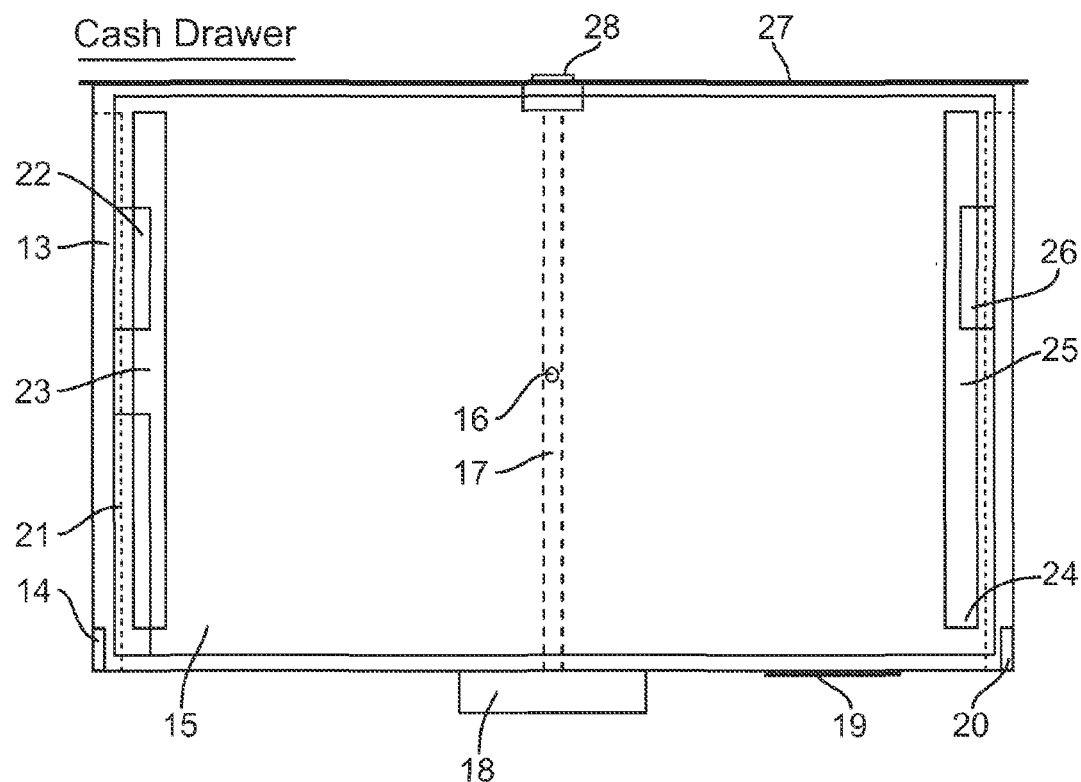
Cash Tray
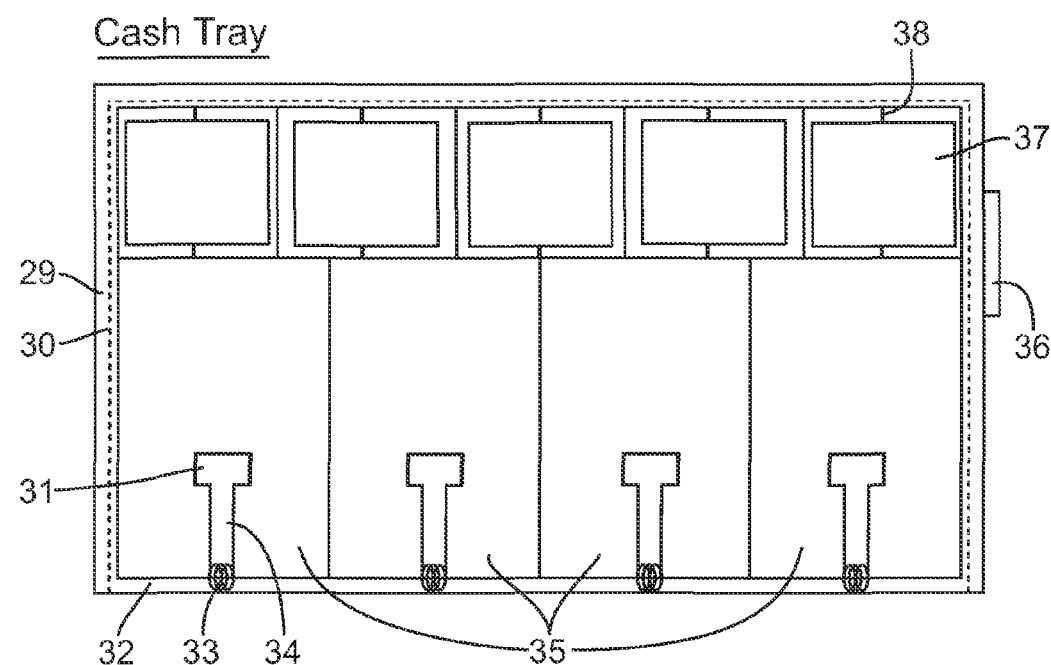
Figure 5 continued

US 9,460,589 B2

CASH REGISTER DRAWER SYSTEMS AND METHODS FOR DETERMINING CHANGES IN THE CONTENT OF CASH TRAYS

CROSS-REFERENCE TO RELATED APPLICATIONS

This application is a national stage of International Patent Application No. PCT/GB2013/050767, filed Mar. 25, 2013, which claims the benefit of the priority of United Kingdom Patent Application Nos.: 1205191.8, filed Mar. 23, 2012, and 1304244.5, filed Mar. 8, 2013, which applications are incorporated herein by reference.

FIELD OF THE INVENTION

The invention relates to improvements in cash registers in electronic point of sale systems.

BACKGROUND OF THE INVENTION

There is a desire to provide cash register systems which enable human error in the introduction and/or removal of coins or other cash tokens may be identified and reported. The invention provides such a system.

BRIEF SUMMARY OF THE INVENTION

The invention provides a method and apparatus for the accurate detection of cash tokens being added and/or removed from a cash register or other cash holding device; that uses pre-knowledge of cash tokens to be added and/or removed from the device; a modified cash tray suspended via a lever mechanism, held in equilibrium against a force transducer; and a processing element to analyse the signal received from the transducer, comparing it against that pre-knowledge, for the purpose of generating or verifying a set of expected cash tokens being added and/or removed from the cash holding device.

The invention also provides an enhanced cash register and supporting system, with the capability to detect cash tokens being added and/or removed from its storage area. This is accomplished by suspending the storage unit on force measurement devices and monitoring the force changes before and after cash tokens are added and/or removed. By strategically placing the force transducers along the axis of the cash tray the change in weight and centre of mass can be calculated. Using these values with knowledge of the expected cash being added and/or removed from the tray (from user-entered transaction information, i.e. payment and refund amount), the combination of cash tokens can be calculated. The accuracy of this process is enhanced by pivoting the coin-holding pods in the cash tray along an axis, which the force transducers are able to measure about. By knowing the specific distances along the axis and the weight distributions of the possible cash tokens, potential combinations can be generated with higher accuracy and probability of each being correct.

BRIEF DESCRIPTION OF THE SEVERAL VIEWS OF THE DRAWINGS

FIGS. 1.1 through 1.3 relate to an overview of a system embodiment of the invention.

FIG. 1.1 is a system flow diagram showing the general operation of the system for a retail transaction.

FIG. 1.2 is a mechanical lever diagram showing how a lever mechanism works to measure forces on the cash tray.

FIG. 1.3 is a graphical representation of the mass distributions of exemplary coinage.

FIGS. 2.1 through 2.4 relate to hardware schematics of cash register drawer system embodiments of the invention.

FIG. 2.1 shows a layout for a cash drawer's hardware.

FIG. 2.2 shows a design for a lever mechanism in a cash drawer.

FIG. 2.3 shows a design for connection of a lever and cash tray.

FIG. 2.4 shows a tray and container mechanism for pivoting coin compartments.

FIG. 5 shows and example device layout of the second embodiment of the invention.

DETAILED DESCRIPTION OF THE INVENTION

Figure 3:
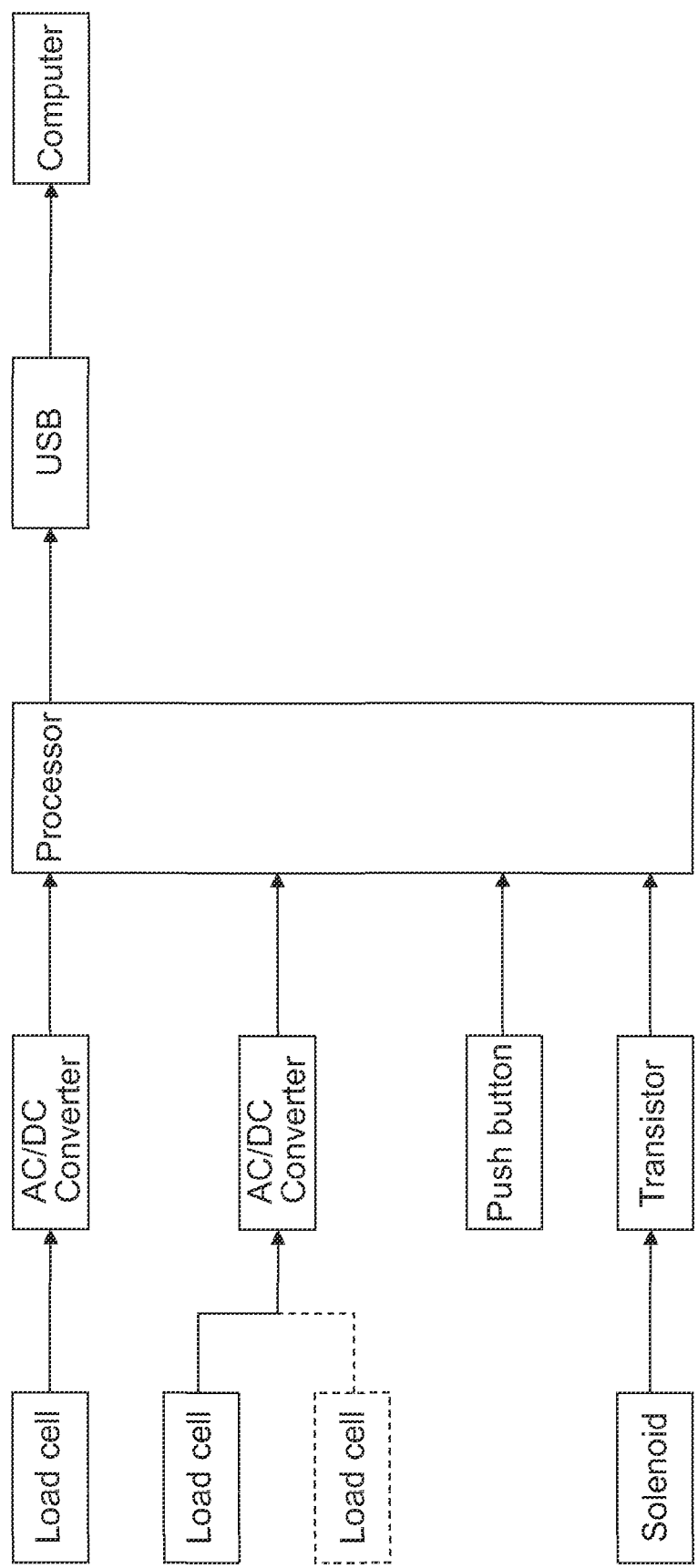
FIG. 3 shows a block diagram of electronics for a cash register system of the invention.

In a first embodiment, the invention provides a system for detecting one or more errors in the operation of an electronic cash register system. The system preferably uses payment amount, total cost and/or refund transaction information to generate a list of possible cash tokens that would constitute a correct cash transaction; and compares the list with measurements taken from the mechanical system holding the cash tokens. In particular, the list of possible cash tokens may be reduced down by scrutinizing each combination against measurements taken from the mechanical system holding the cash tokens. It may be further reduced by using pre-knowledge of the likelihood user activity and patterns of behaviour.

The method may include the step of taking measurements of the cash tokens in the mechanical system holding those tokens. That system may, for example, be a cash drawer or tray. The cash token combination list may be reduced using the measured change in weight of the cash token contents between the opening and closing of the cash drawer, in order to identify each combination that could produce that weight change and discarding those that cannot from the list. The measurements taken may be any appropriate measurements to enable the likely combination of tokens to be identified. For example, the measurements may be of the weight of the tokens. The location of the tokens may also be taken into consideration. The cash drawer may be provided with a cantilever or lever mechanism to allow such measurements to be taken. In a particular embodiment, the cash token combination list is reduced using pre-knowledge of cash token weights and a force change being measured between the opening and closing of the cash drawer, at a fixed point along the pivotal axis of the cantilever or lever mechanism in the cash drawer. The lever or cantilever may be provided with one or more force measurement devices along its pivotal axis. One or more measurement may be taken in order to verify each combination that could produce that force change, either by each token being placed in its correct compartment or by being placed in an incorrect compartment and discarding the combinations that cannot from the list.

The purpose of the system is to identify incorrect or fraudulent transactions. The reduced list of cash token combinations is used to calculate a probability for the transaction being correct, or otherwise deemed suspicious or impossible; the probability may then be used to alert the operator if the transaction is suspicious or impossible, and the information is stored to be used by other systems.

The invention also provides a mechanism to suspend a plurality of cash tokens in a cash drawer on a cantilever or lever having a fulcrum point and an end; whereby the weight and turning force of cash tokens in the drawer can be measured by two force transducers, one positioned at the fulcrum point and one at the end of the cantilever or lever. Also provided is a cash drawer or tray comprising such a mechanism, and a point of sale system comprising such a mechanism. The point of sale system preferably also comprises a cash drawer.

The cash drawer preferably comprises a plurality of suspended coin holders pivoted at set points along the axis of the cantilever or lever for holding the cash tokens and for allowing the weight of the cash tokens to be applied and/or measured at a set points along that axis; containing note containers that allow only minute movements along the axis of the cantilever or lever, keeping the centre of mass of the contained cash note tokens applied at the central points along that axis in the container.

A force transducer may be positioned at a fixed point along the axis of the cantilever or lever, such that the reactive force applied between the force transducer and cantilever or lever is capable of holding the system in equilibrium. Using the pre-knowledge of the distances between the force transducer and fulcrum point, and the distances between the fulcrum point and the applied weights of each of the cash token containers along the axis of the cantilever or lever, along with a measured signal produced by the force transducer, the possible cash tokens added and/or removed between two adjacent measurements can be calculated.

A force transducer may also be positioned beneath the fulcrum point of the cantilever or lever, such that the reactive force between the cantilever or lever and the force transducer is in equilibrium with the weight of the cash tray and the reactive force of the other force transducer against the cantilever or lever. This allows the weight of the cash tray to be worked out by calculating the difference between the measured force from two force transducers. This enables the possible cash tokens added and/or removed between two adjacent measurements of the force transducers to be calculated.

Whilst the usual weight of the cash tokens may be known, the cash tokens may be assumed to have non-standardized masses due to damage and/or dirt through general usage, resulting in a probability mass distribution unique to each type of cash token; and are processed with the pre-knowledge of these mass distributions.

In a second embodiment, which may be independent of, or combined with, the first embodiment, the invention provides a system that uses two or more force measurements taken about the suspension points of a suspended container for containing change, for the purposes of calculating the change in the container or a range of potential solutions for the contents each with an associated probability of that solution being correct; assuming the contents only contains a predefined list of items each with an associated normal distribution of mass. The system preferably comprises one or suspended change containers and a mechanism for measuring at least one, preferably at least two forces about the suspension points of said container.

The system preferably provides or is implemented into a system capable of detecting fraudulent cash activity via a probabilistic method involving the generation of a list of possible cash token combinations that could be added and/or removed from a suspended cash token storage unit, given an expected total value of cash being added and removed from that unit; then detecting and excluding impossible or highly unlikely combinations by using force measurements taken about the cash storage units' points of suspension in conjunction with the Gaussian force distributions that each type of cash token is expected to exert on the units' suspension points; and finally analysing the plurality of remaining combinations to identify potential fraudulent activity.

The impossible and highly unlikely cash token combinations are preferably detected and excluded from the list when the total measured change in forces about the cash storage units' suspension points does not fall within a calculated range of forces, which that combination could produce in the system; this results in combinations being excluded when the change in weight of the cash container cannot be accounted for by that combination occurring.

Alternatively, or additionally, impossible and highly unlikely cash token combinations are preferably detected and excluded from the list when the measured change in force about a suspension point for the cash storage unit, does not fall within a calculated range of forces, which that combination could produce in the system at that point.

Alternatively, or additionally, impossible and highly unlikely cash token combinations are preferably detected and excluded from the list when using the measured force changes to calculate the change in the centre of mass of the cash storage unit and contents, and determining if it does not fall within a calculated range of centre of mass changes, which that combination could produce in the system.

The cash token storage unit may have been enhanced to improve the accuracy of the system by focusing the weight of each cash token on specific discrete distances along an axis; and in doing so reduces the range of forces that can be exerted on the suspension points by a single token and combinations of tokens. This may be achieved by providing the cash token storage system with a slightly larger than note sized container that restricts the movement along that axis. Alternatively, or additionally, the weight of cash coin tokens may focused at discrete distances along an axis by means of suspended containers that are pivoted along that axis at those distances and swing freely under gravity. In that instance, it is preferable that when the system is at rest, the combined centre of mass of the container and all contents is in line with the pivots.

The system may be integrated into an electronic cash register device as a component in an electronic point of sale system. In particular, the system may be further integrated with the cash register in order to detect and record general cash register activity, and human interaction with the device. The device may include a cash tray position mechanism to detect and record whether the cash drawer is open and exposed to potential operators or closed and shielded from operator activity. It may also include a signal detection element to detect and record when the cash register has been opened via an automated or electronic means. The device may also include a combination of mechanisms to detect and record when the cash drawer is opened manually, opened automatically, or closed manually. The device may also include a combination of mechanisms to detect and record when the cash drawer has been locked or when the cash drawer fails to open automatically.

The system preferably is preferably able to communicate with external computer systems, which includes measurements, system activity, operator activity, maintenance information and other internal states, via for example a wired or wireless mechanism. The system is preferably provided with a memory that is accessible for the purpose of storing installation files and device specific information. Such a memory may be an internal flash memory. Alternatively, the device may be provided with the capability to connect to and exchange data with a remote memory or storage system.

The invention will now be described in detail, by way of example only, with reference to the drawings.

FIG. 1—System Overview

FIG. 1.1—System Flow Diagram

The FIG. 1.1 diagram shows the general operation of the system for each retail transaction in which the invention is used. When a transaction is entered into an electronic point of sale (EPOS) terminal the information is stored in a log file, which is then parsed into an algorithm to generate a list of all cash token combinations that could equate to the value of the payment and the value of the refunded change, up to a pre-set maximum number of tokens per combination. At the same time a print receipt message is sent to a printer device, this triggers a solenoid in the cash drawer to fire releasing the lock mechanism inside allowing the operator access to the coins inside. The operator attempts to put the cash tokens in the correct compartments, removes the correct value in change, and then closes the cash drawer. After a short settle time a measurement is taken from the turning force transducer and the pivotal force transducer, is processed into a turning force and a weight value and sent to the computer to compare against the generated list of cash token combinations. Meanwhile after the cash drawer is closed, there is a short delay due to the operator tearing the receipt and begin to hand the cash to the customer. During this short delay several fast algorithms will run, reducing the list of token combinations down significantly. First the list is reduced based on the weight differential between the most recent measurement and the previous one, discarding combinations that could not produce the mass differential. Next the list is processed against whether the combination could produce the measured turning force differential (calculated by the difference between the current and immediately previous turning force measurement), based on whether the tokens were placed at the expected or different compartments in the cash tray. Once the processing is finished, a probability is generated for any remaining combinations on the list; if there are no combinations left or if the probability is below a certain level then an alert is sent out to the operator, to double check the change taken out of the drawer. If the operator chooses to act on the alert, then the original combination list is reprocessed with new force measurements once the operator adds and removes the necessary cash tokens and gives the corrected change to the customer. All this activity is stored on a local log file and then sent off to a storage server.

FIG. 1.2—Mechanic Lever Diagram

The FIG. 1.2 diagrams show how the lever mechanism works in order to measure both the turning force the cash tokens apply and the total weight of the cash tray and tokens. Essentially all the cash tokens are stored in compartments in a tray. In order for the weight of the contents of each compartment to be applied at a single point along the axis of the lever, the coin containers are pivoted allowing the centre of mass of the container to swing. Similarly the note containers are modified to allow only slight movements of the notes along the axis of the lever, thus reasonably assuring the cash notes applied weights are at set points along the lever. Additionally the points at which the weights are applied do not overlap, thus allowing weights to be distinguished from each other using an algorithm.

When the system is flattened into two dimensions (gravity and the length of the lever) you can see the effective turning force of each weight about the fulcrum point, which is held in equilibrium by the reactive force applied by the force detector. The system can also be seen to be held in equilibrium vertically, reactive forces countering gravity as there is no movement on that axis. These two states of equilibrium produce two equations which can be used to calculate the weight of the cash tray and tokens and also be used to compute the weights applied at each of the distances.

FIG. 1.3—Cash Mass Distribution

The FIG. 1.3 diagrams show the mass distributions of some Great British Pound (GBP) coinage. GBP coinage is used as an example only—any other coin tokens could also be used and the system duly calibrated. Due to damage through usage, age, dirt, and production variations, the masses range from the expected mass by a small amount. The variations differ uniquely for each type of cash token, whether they are a coin or note; and these variations form a bell-curve when measured in bulk, which can be used to calculate the probability a cash token lies within a range of masses. The diagrams shown were created from a data set of the masses of one thousand cash tokens taken from circulation.

FIG. 2—Hardware Schematics

FIG. 2.1—Preliminary Hardware Layout

The FIG. 2.1 diagram shows a preliminary layout for the cash drawer invention's hardware. The diagram is split into three sections showing the three components of the cash drawer: the cash register housing, the cash drawer, and the cash tray. The cash register housing section shows a fairly standard layout: a simple wheel and slider mechanism for the cash drawer, a spring loaded catch & locking mechanism, and a cable inlet/outlet block. The cash drawer section shows the standard drawer components along with the invention specific modifications. The components labelled 21 to 26 are the invention specific modifications, they consist of electronics for handling the force measurements and for managing communication with the a computer system; a lever mechanism (23) that is pivoted (24) against a load cell (25) and held in equilibrium against a load cell (22); and a mechanism (26) to allow for the cash tray to attach to the lever. The cash tray has been modified such that the coin containers are pivoted at set distances that do not overlap with the centres of the note containers. The coin containers hang freely allowing the centre of mass of the containers and contents to move in line with the pivot point. The attachment (36) is designed to attach the cash tray rigidly to the lever mechanism in cash drawer.

FIG. 2.2—Lever Mechanism

The diagram in FIG. 2.2 shows a preliminary design for the lever mechanism in the cash drawer. This element houses the two load cell systems to that measure the downward force on the pivot and the upward turning force of the lever. The lever mechanism is attached to the side of the cash drawer using the ridge on the side as an anchor. The pivot is raised so that the lever, when attached, would be roughly perpendicular to the force of gravity when resting against the housed load cell.

FIG. 2.3—Tray & Lever Connection

The diagrams in FIG. 2.3 show a preliminary design for the lever design and the cash trays connector mechanism to mount on the lever. The lever diagram shows a right angle crank that has a large area attachment that connects with the cash tray so that the turning force is spread over that area.

FIG. 2.4—Tray & Container Mechanism

The diagrams in FIG. 2.4 show a preliminary design for the pivoting coin compartments. The designs show a clip on the pivot axis on each of the coin compartments, which rests on two points on the pivots in the surrounding housing. The pivots are equally spaced along the lever axis and the distances are set such that the effective turning forces about the lever pivot do not align with each other to a reasonable degree.

FIG. 3—Electronics Schematics

Preliminary Block Diagram

The diagram in FIG. 3.1 shows a preliminary block diagram for the electronics of the invention. There are at least two force transducers (in this case load cells are used) attached to separate AC/DC converters and input into the processor; multiple force transducers can be used in parallel attached to an AC/DC converter. The force transducers measure the turning force of the cash tray lever mechanism of the invention and the downward force applied on the pivot of the lever mechanism. Additional inputs for the processor include a push button switch for the detecting when the cash drawer is opened and closed and a transistor mechanism to detect when the solenoid fires in the catch & lock mechanism. The processor manages all the input mechanisms and outputs it via a USB interface to a computer for further processing.

Figure 4:
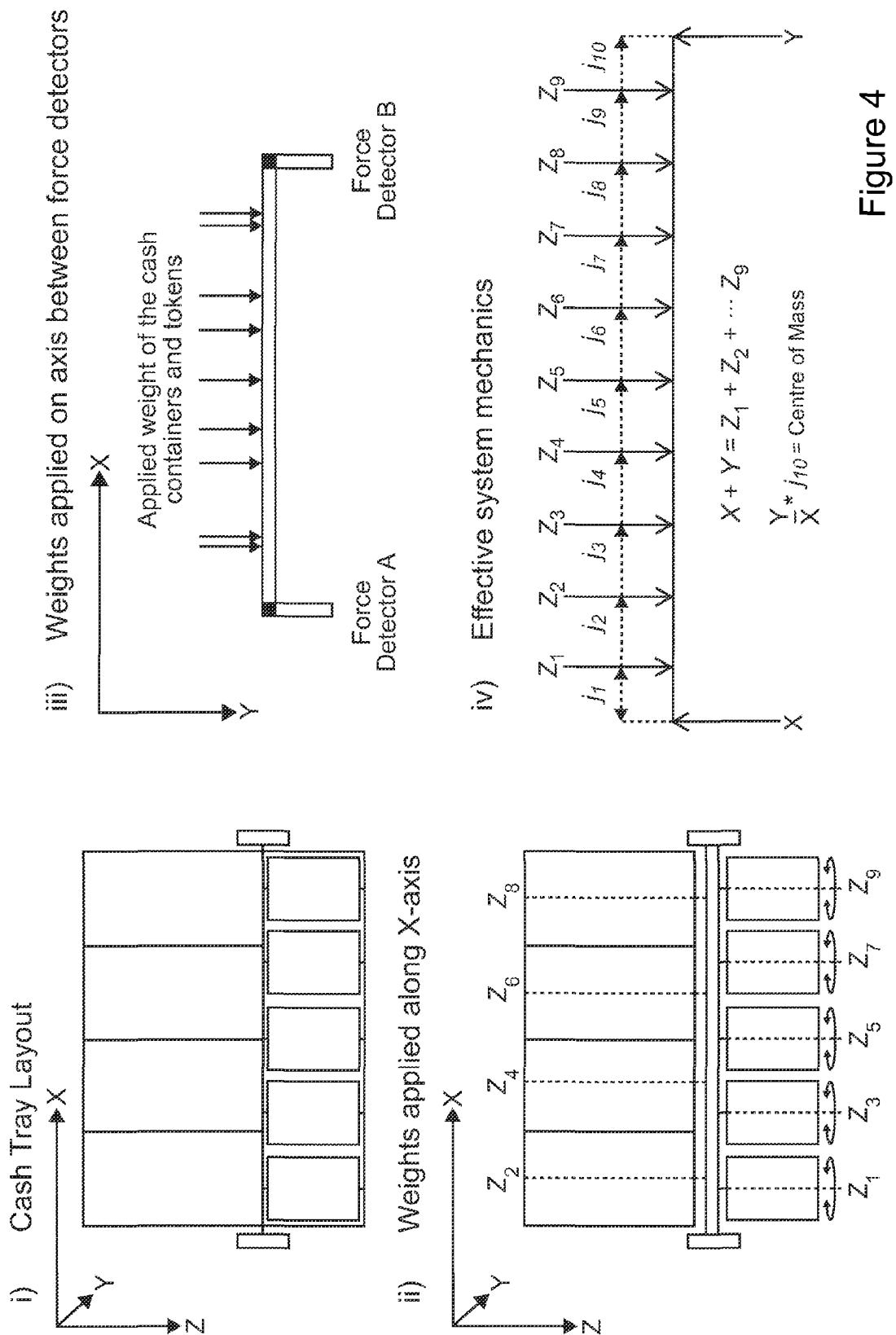
FIG. 4 shows a pivoted cash tray mechanism of the second embodiment of the invention.

FIG. 4 shows a pivoted cash tray mechanism of the second embodiment of the invention.

FIG. 5 shows an example device layout of the second embodiment of the invention.

EXAMPLE 1

The invention provides an improvement to the standard cash register in an electronic point of sale (EPoS) system that enables the system to keep track of physical cash entering and leaving the cash register. The improved cash register does this by taking several force measurements about the cash contents and from its general usage, performing some minor processing on these measurements and then sending them to the computer in the EPoS system for further processing and use in other systems.

The method of identifying cash being added and/or removed from the cash register uses the transaction information gathered from the EPoS software interface, namely the amount to be paid into the register and the amount to be refunded. This information is parsed into an algorithm to generate a list of cash tokens combinations that equate to those two values. In order to prevent this list and algorithm running for too long the number of tokens in any given combination is limited to a predefined number. For example, it is fairly rare that more than ten cash tokens are ever used to pay or refund an amount of money in a retail transaction; therefore generating combinations that contain more than ten cash tokens is fairly redundant. The crux of the invention is to then compare each item in this generated list against a simulation of the physical system with measured values gathered from the live hardware for that transaction. A probability is generated for each item in the list and a combined probability for the transactions likelihood of being correctly executed is calculated, which is stored and can be used in other systems. FIG. 1.1 shows the invention being used to power two such systems: a real-time loss prevention system that alerts the EPoS till operator to recheck the amount of money taken out of the register and an information gathering system that can be used to evaluate a rating for an operators activity or to verify that the log keeping from the cash reconciliation is correct.

The hardware inside the modified cash register is designed in such a way that it suspends the cash holding tray as a lever, which is held in equilibrium against a force transducer while pivoted against another force transducer. This allow two forces to be measured from the cash contents: the total downward force of objects acting on the lever and the total turning force caused by the cash tray and tokens on the lever from a set distance away. These measurements are processed to find the effect that a single retail transaction has had on the cash contents and is done by taking the immediately previous measurements and subtracting them from the current ones. To turn these measurements into more meaningful values, the weight of the cash tokens is calculated by subtracting the measured turning force from the downward force on the pivot measurement. FIG. 1.2 shows the general concepts behind this lever and measurement mechanism, along with the relevant equilibrium equations.

The cash tray is modified such that the cash token content's masses are applied at set point along the axis of the lever. This is for the purpose of virtually remodelling the system with a much greater accuracy, based on the extracted measurements. The cash tray is modified in two ways to do this. The cash note compartments are shaped such that the cash notes are unable to move along the axis of the pivot to a significant degree. Due to the consistency in mass distribution throughout the notes volume the centre of mass is kept roughly in line with the centres of each compartment. The cash coin compartments are modified such that each individual coin compartment is pivoted on the axis of the lever, allowing the centre of mass to swing and rest in line with the pivot point. An example of this can be seen in FIG. 2.4. The positioning of the centres of the cash compartments have been spaced so that they do not line up with one another along the axis of the lever. This is to more uniquely identify where a cash token has been placed, the compartments that are further away from the lever's pivot point causing more turning force than closer ones. The spacing has also been designed with the lever's pivot point and the distance to the (turning force measuring) force transducer in mind. The distances are set so that the turning forces caused by standard cash tokens from a single official currency do not overlap with one another making it possible to identify the cash tokens uniquely from one another not only on weight but also on the positions that they are placed within the cash tray.

The measurements are taken by the use of force transducers in certain locations in the design. An example of this is the use of load cells as shown in the FIG. 3.1 and the positions in FIG. 1.2. In order to measure the forces accurately the load cells are attached to an alternating current, by measuring both peaks of the signal background noise is cancelled out giving a greater accuracy, hence the AC/DC converters. The signals are sent to a processor to convert them into values and these are sent to a USB chip to convert the values into the correct format to communicate them to the computer. In addition to this the electronics also monitor general cash register activity, such as the firing of a solenoid in the catch/release mechanism and a push switch that detects when the cash drawer opens and closes. These signals are also sent to the processor to be communicated to the computer.

The values when received by the computer are date stamped and stored in a log file for backup and reference purposes. It is assumed at this point that the list of cash item combinations for both the payment and refund have been calculated, because the amount of time taken for the generation is substantially smaller than the user related activity for operating the cash register. Firstly the weight change value is used to shortlist the list of every combination. This is done by comparing the two generated lists and finding the combinations that could produce the given weight change, this is stored in a separate list (aka the shortlist). The reason the weight change value is done first is it is relatively less process intensive when compared to the simulation algorithm required to compare the turning force value; this is important due to the time limitation of the user gathering a receipt from the retail transaction and handing the change cash tokens to the customer. An example of the weight value being compared:

| Transaction: | | |
|---|---|---|
| Payment: | £5.00 | |
| Refund: | £2.01 | |
| Current combination: | | |
| Tokens added: | £5 note | (0.88 g) |
| Tokens removed: | £2 coin, 1p coin | (12 g + 3.56 g) |
| Resultant mass change: | | −14.68 g |
| (Min: −15.12 g Max: −13.98 g) | | |
| Measured mass change: | | −14.58 g |
| Possible Combination: | Yes | (Measured mass is within range) |

Each of the combinations in the shortlist is then simulated in an expected behaviour model—this is where the turning force is generated for each combination, assuming that all the tokens are placed in the correct compartments. It is important to do this stage as the algorithm to determine the turning forces assuming the tokens could have been placed in any compartment is an order of magnitude more complex and as it is an uncommon event tokens are placed in the wrong compartments it saves on processing time. The simulation involves the equations in FIG. 1.2: the known distances are used for each of the token types in each combination and the expected turning force is calculated about the pivot point. The turning force is then compared much like the previous mass comparison and a further short list is generated. If this further shortlist is empty or the probability of the shortlist is below a set level then a more complex simulation of the hardware is made, where each cash token in each combination is used in every possible compartment (coin compartments for the coins, and note compartments for the notes); this is also compared against the list of combinations like the previous comparisons. The finalized list is then processed for the probability of each combination and the total probability that the transaction has been operated successfully; the information is then stored in a log file to be used by further systems.

Due to damage through general use, dirt and grease through handling, and production defects the masses of cash tokens deviant around a mean mass. The masses when collected on large scales and displayed in a mass distribution graph, as shown in FIG. 1.3, result in bell curve style distributions. These distributions are unique for each type of cash token in every possible currency. They can be used to generate a probability for cash tokens being of a certain mass, or in this implementation the probability of a group of cash tokens being of a certain mass. This is useful because increases the accuracy of detecting coin combinations that would contain extreme mass outliers. Due to the range of masses all the force measurements are affected by this, so it is important that the characteristics of the tokens are used when processing the lists of cash token combinations.

As stated previously some of the systems that are able to take advantage of these results include: real-time loss prevention systems to prevent mishandling of cash, data gathering systems, and a verification system for the cash reconciliation records.

The real-time loss prevention system takes advantage of the speed of the transaction probability calculation in comparison to the time taken by the till operator to finalize the transaction. Once the probability has been generated it is assumed that the till operator has gathered the customer receipt and is about to hand over the money to the customer. At this point if the probability is below a certain level an alert is sent to the computer screen for the till operator to recheck the money. Alternatively a simple alert system can be used to tell the till operator to either wait before handing over the money, hand over the money, or a recheck money message. The till operator will either ignore the message or act on it. If it's acted on then the cash register will be opened and the cash will be changed, new measurements will be taken and communicated to computer, which will result in a new set of processing being done on the original generated list for the transaction. An alert will be shown if the transaction has again been done incorrectly, it can either be ignored or acted on.

A data gathering system implementation is fairly simple in comparison, as the system stores information in its log files, whether they are the simple activity of the cash register, measurements taken, or the generated shortlist and probabilities; this information is forwarded to either an in-store temporary storage server to be sent to a centralized headquarters storage server, or just to be sent directly to the headquarters server. Further analysis techniques can be used on this centralized store of information, such as performance analysis on individual till operators, overall store performances, time taken per transaction, and a vast number of other analytical techniques.

The data gathered by the system can also be used to verify the cash reconciliation stages at the start and end of the day. Based on the total measured values from all the cash registers, an algorithm can be used to verify whether the count of money is correct. Alternatively depending on the procedures used in store, it can be determined easily if money cash gone missing from a register while it was stored in a cash safe overnight. This is an important system, because it removes an amount of trust needed for management employees when counting and handling large amount of money, to a certain extent.

In addition to taking the force measurements, the cash register has been modified to also record and report its general activity; such as electronic signals opening and closing the cash register and whether they fail, and the manually opening and closing of the cash register. The monitoring of these are important, because of the parallel in the field in which the invention is in; specifically it brings attention to when the cash register has been accessed outside of a transaction, and can assist in the prevention of thefts.

The cash register looks and operates as a regular EPoS cash register; the additional modifications do not interfere with its operation. The layout of the device internals can be seen in FIG. 2.1. The only parts that are relevant to this invention are: the USB cable outlet, the lever mechanism and load cells located on the side of the cash drawer, the electronics for processing the load cells and managing the communication with the computer, the connection point on the cash tray to attach to the lever mechanism, the pivoted coin containers, and the modified cash note containers.

The USB cable outlet is located on the cable block attached to the base of the cash register, it is simply designed to allow the USB communication cable to escape the cash register housing securely.

The lever mechanism and load cells are located on the side of the cash drawer, and are roughly designed as shown in FIG. 2.2. The lever mechanism is lined up roughly with the centre of mass of the cash tray to prevent turning forces in the perpendicular direction that the lever does not operate in. The lever mechanism comes in two parts, with three load cells installed for stability. The pivot rests on two load cells, which in turn rest on a platform that hooks up and over the lever for a load cell to be housed. The housed load cell is positioned such that the lever rests against it; hence the reactive force of the load cell causes the lever to be held in equilibrium. An attachment at the end of the lever is shaped so that the tray connector can attach and be removed easily, while also giving a large area for supporting the turning forces and weight of the tray when loaded.

The electronics for processing the load cells and managing the communication with the computer is housed in the side of the cash drawer, towards the rear of the compartment. This is to keep it relatively protected while also keeping it close to the load cells for a more signal. A USB cable is passed through the flooring of the drawer and connected to the USB cable outlet, with enough slack so that the drawer can open and close normally without the USB cable being in tension at any point.

The side of the cash tray has been modified with a connection point that rigidly attaches it on the end of the lever mechanism. It is a slot type connector that allows the tray to be connected and removed easily from the drawer.

The pivoted coin containers are located in the cash tray lined up along the axis of the lever mechanism as shown in FIGS. 2.1 and 2.4; also the modified cash note containers are shown.

EXAMPLE 2

The invention is an enhancement for cash registers and other cash storage devices that rely on a human operator to add and remove physical cash tokens from it; a cash token being a coin, note, or other standardized physical object that represents a fixed value of currency. The enhancement enables the ability to measure and record the total mass change and the centre of mass of the cash tokens being added and removed from the device with high accuracy. This is useful for keeping track of money given to and taken from customers in a retail environment, and even more useful when directly compared with the recorded transaction information for those operations. By directly comparing the measurements taken before and after a transaction, the difference in values can be attributed to cash tokens being added and removed from its contents. These values can then be compared with the expected values of what was added and removed (taken from the transaction receipt records) to calculate the exact combination of cash tokens that have been added an removed from the device; should there be a discrepancy in this calculation then that can be attributed to accidental and/or fraudulent use, this can also be attributed to specific individuals an acted on appropriately. To further the usefulness of this system, the time of each detected event can be used to select segments of video footage overlooking the transaction, and automatically linking them with transaction events. This allows loss prevention staff to detect fraud much more effectively and efficiently.

The invention uses a cash tray strategically suspended on force transducers, in order to measure the distribution of force, centre of mass, total mass of the tray and contents, and other key measurements. To calculate the centre of mass along the axis between two force transducers the ratio of force between the two measured forces can be used to determine how far along the axis the centre of mass lies or alternatively the centre of mass can be triangulated using three or more force transducers. These measurements can then be further used to calculate the change in centre of mass before and after a combination of cash tokens is added and removed from the cash tray; or to state it another way, after a retail transaction. These equations are as follows:

i. Centre of mass between two points:

$$CoM_n = \frac{m_2}{m_1 + m_2} d$$

$CoM_n$=centre of mass,
$m_1$=mass measured at point 1,
$m_2$=mass measured at point 2,
d=distance between point 1 and point 2 ii. Difference in centre of mass:

$$\Delta CoM_{AB} = CoM_A - CoM_B$$

$\Delta CoM_{AB}$=Change in centre of mass
$CoM_A$=Centre of mass after event
$CoM_B$=Centre of mass before event Knowing only the change in centre of mass may not be enough information to generate a sensible number of possible cash token combinations, using a reasonable amount of processing power. The algorithm to generate this would be very processor intensive and require a large amount of time, assuming limitations are enforced on the set size else it would require infinite time to search the solution space. Fortunately more information on the retail transaction is available, and can be extracted from electronic point of sale (EPoS) transaction logs and combined with the measurements taken about the cash tray, using a simple time based synchronization process (FIG. 1.1). The relevant information extracted is: the "expected" value of cash being added to the cash tray, which would be the payment; and the "expected" value of cash being removed from the cash tray, which would be the refund (or change). These two values can be used to efficiently generate two lists of possible cash token combinations, one for all the possible combinations that could result in the "expected" payment value (tokens added to the cash tray), and the other all combinations that could result in the "expected" refund value (tokens removed from the cash tray). These two lists can be combined and have assigned to them a calculated value for their expected effect on the cash tray measurements, i.e. the location of and the change of the centre of mass. These values can be easily cross-referenced with the received measurements from the cash register hardware in order to truncate the combination list down into a short list of potential solutions.

The accuracy of this system to measure the added and removed cash tokens relies on two key assumptions: each type of cash token has its mass standardized to a high accuracy and the location where each type of cash token is stored is fixed, to a degree of accuracy. The more these two properties deviate from their expected value, the less accurate the system will be in isolating a single possible result for a transaction. The standard deviation of cash token masses cannot be controlled by the system, but it can be calculated from a large sample of tokens in active circulation; and it can also be assumed that this value will not change at a rate that will affect the system in the short term.

However, the location at which the cash tokens lay at rest can be controlled by the system. Typically the cash tokens are stored in separate containers inside a larger cash tray unit, with the coin tokens stored in pod or cup shaped compartments, and the cash note tokens in box shaped compartments. The invention has modified this typical layout to more accurately apply the weight of the tokens at specific points along the axis' of the tray (FIG. 4).

To accomplish this there are two modifications designed around the specific properties of the coin tokens and cash note tokens. The cash notes are stored much the same way; however, their freedom of movement is restricted about the width of the tray. This results in the collective weight of each type of cash note being applied at the central point about the width of each compartment (FIG. 4). The coin tokens require a slightly more complex solution to apply their weight at a single position due to their more regular use, larger volume, and need to be easily accessible to till operators. In order to accomplish this, the coin compartments (pods) have been raised from the tray and suspended on a pair of pivots that have been aligned perpendicular to the axis across the width of the cash tray (FIG. 5). This allows the pods to rotate about the pivots with small a hysteresis (which is further reduces from the shape of the pivot mechanism); with the pods capable of swinging freely, the collective centre of mass of the pod and all of its contents will rest in line with the two pivot points, resulting in the weight of its coin contents being applied at that point. When a coin is added the containing pod will rotate slightly due to gravity until its centre of mass is again in line with the two pivots.

With the weight of all cash tokens being applied at known points it becomes a much simpler task to simulate the effect a combination of tokens would have on the system, allowing for a much higher accuracy overall.

In addition to the physical modifications on the hardware to enhance the inventions accuracy; logical enhancements have also been made to further reduce the number potential solutions.

When generating the potential token combinations for the payment, it can be safely assumed that none of the individual tokens used in the payment will be less than the expected refund. For example, when the required payment value is £8.00 and the actual payment value received is £10.00, it can be safely assumed that the payment does not consist of £1 tokens, or £2 tokens; as in real-world scenarios they would be given back to the customer prior to the received payment value being recorded.

This is true in most cases with the exception of when a customer adds an additional value to their payment for the purpose of receiving a smaller set of tokens as a refund. For example, when the required payment is £4.03 and the actual payment value received is £5.03, with the customer's expectation of receiving a £1 token as a refund. In this case, with only the previous assumption, no combinations would be generated as the £0.03 additional payment is less than the refund value, therefore additional logic is needed.

It can be assumed that the previous assumption can be ignored when the additional payment value would result in a smaller refund size. As a shortcut for this assumption, to improve performance, it can be instead assumed that should the coin token being investigated have a value less than a currency scalar value (CSV) (20% for GBP) of the previously accepted token when building a combination then ignore the previous assumption can be ignored. For example, when the required payment is £4.03 and the actual payment value received is £5.03, with the customer's expectation of receiving a £1 token as a refund. The part built possible token combinations would be a £5 with £0.03 remaining. When checking the £0.02 and £0.01 tokens, because they have a value less than or equal to 20% of the £5 token (£1) they can still be added to the combination. The final combination result in this scenario would be:

£5, £0.02, £0.01
£5, £0.01, £0.01, £0.01

A different scenario, which is relevant, would be when the required payment is £4.00 and the actual payment value received is £6.00, with the customer's expectation of receiving a £2 token as a refund. The generated potential token combinations would be:

£1, £1, £1, £1, £1, £1
£2, £2, £2
£5, £1

The first potential combination would not be generated as the final tokens, pushing the cumulative value above the required value have more than 20% of the previous token (£1 is more than 20% of £1). The second potential combination will not be generated for the same class of reasons as the first. While the third would be generated as the final £1 token has value equal to 20% of the previous (£5) token, which in the end lines up with the customers expectation, while also removing all redundant combinations.

The same constraints and assumptions don't apply to generating potential token combinations for refunds, which require a different set of logical enhancements. Whereas payments can be made using any type of cash token, refunds combinations are expected to be optimized by the till operator to use the least amount of tokens possible. For example, for a refund of £1.73, the expected combination would be:

£1, £0.50, £0.20, £0.02, £0.01

This is not always the case, for example, when the cash register has run out of a type of token. This will be a rare occurrence in retail stores as the registers are regularly refilled, and should an issue arise with a low quantity of coins then it will usually be restocked quickly. But as the event cannot be excluded completely the algorithm must generate all possible combinations that could be given as a reasonable refund. A reasonable refund can be constituted as any refund that does not have more than an arbitrarily set number of tokens, 10 is an acceptable value for this. Due to the rarity of running out of a specific token, it can be recorded as suspicious if the refund combination remains after the cross referencing phase.

When combining the two lists of token combinations together, it can be safely assumed that a refund will not contain any identical tokens as the payment; due to the fact that the behaviour would be redundant, and the duplicated token would be handed directly back to the customer rather than being added to the cash tray. And therefore a large number of potential combinations can be truncated prior to being simulated and cross-referenced with the cash tray measurements. For example, a payment combination of £5.00, £1.00, £1.00 cannot be combined with a refund combination of £1.00; due to the fact in the reality a £1.00 token would not be redundantly added and then removed from the cash register, whereas a payment of £5.00, £2.00 could be combined with a refund of £1.00 as there would be no redundancy.

As mentioned previously the system's accuracy is highly dependent on the cash token masses consistency. The more widely spread the mass of each token type is the more noise it adds to the system calculations. The tokens masses typically vary due to several reasons:

Production system and general defects

Scratching, chips and other damage

Dirt, grease, & other markings

Typically the production of cash tokens is standardized, production quality high, and defects are rare due to the need of preventing counterfeit tokens. Over time the tokens can gain and lose mass from the effects of damage and dirt, this along with the minor production defects gives a Gaussian distribution of mass for each type of token (FIG. 2.1). It is best to sample active tokens to get a more accurate representation of the effects of dirt and damage.

In order to increase the accuracy of the system for real-world application, these Gaussian distributions must be taken into account. This is done when the system simulates the effect a cash token combination would have on the measurements; the cash token masses are be seen as a Gaussian distribution instead of a single value and combined. This gives a token combinations mass Gaussian distribution, and can be further used to assess the likelihood that that particular combination occurred. This is done by substituting in the cash tokens mass and simply finding the result. The higher the value the more likely it is that it occurred, as the further from the mean the substituted mass is the more the combination must use rare mass outliers. The Gaussian distribution is used on all measurements taken about the cash tray ion order to get the greatest effect.

Two additional adaptions have been made and features added, in order to increase the invention's loss prevention capabilities.

The first is a modification to allow the cash register to detect and electronically record when it has been opened via an electronic trigger, opened manually, and closed manually. This has two benefits, the first being increased synchronization with its interaction with the operator, and the second being the ability to detect and record when a register is manually accessed or when a register has been open for a long period of time. This is useful for loss and fraud prevention, as it can highlight times when the register was directly pilfered outside a transaction.

The second modification allows a real-time alert to be displayed on screen for the benefit of the till operator. It is displayed when a cash transaction is deemed suspicious, or when the algorithm does not find a valid combination of cash tokens to match the real measurements taken about the cash tray. The alert is configurable on a per till basis and has a timed automatic close feature to prevent redundant alert. The benefit of having this feature is mainly to demonstrate to till operators that the physical cash is being monitored automatically, thus dampening the idea and temptation of stealing from the cash register with low risk of it being tracked down. Another benefit is the ability to catch accidental short-changing and over refunding customers, simply when this occurs the alert will be displayed in real-time once the register is closed, allowing the operator to recount the refund amount and act accordingly prior to handing it to the customer.

The following description of the invention's physical attributes is a rough overview of a potential layout for the system and is not intended to cover all possible implementations. There are however several features which will be common among all implementations of this system. The system will be embedded inside a cash register or similar cash storage device, in order to maximize the usefulness and accuracy of its features. The device will use at least two force measuring devices located such that a cash storage unit is suspended in equilibrium on it; in order to allow the centre of mass to be calculated between the two devices, or alternatively triangulated using three or more force measuring devices. The controlling electronics for the intelligent cash registers activities are housed inside the cash register protected from directed access from till operators. A method of communicating with the EPoS till machine is needed, whether that is implemented via a wired or wireless method is not important.

A potential design to implement the system would be embedded into a standard EPoS cash register unit, with a spring loaded cash draw triggered via either a manual latch or an automated latch with a solenoid. There are two force transducers on either side of the cash tray, supported by a surrounding block which aligns them to the same height and prevents over extension, due to an over loading, with a supporting block. A raised guide is attached to the measuring end of the force transducer to provide greater contact with the side lip of the cash tray. The cash tray may be added and removed from the drawer easily, and rests on the two guides and is prevented from moving too far back or forward by a pair of stoppers at the front and rear of the guides. The cash tray has five coin pods are equally distanced apart, suspended on pivots along the axis between the two force transducers, the tray also has cash note compartments at the rear, which prevent any contained notes from moving off centre. The cash register's controlling electronics are split into two separate printed circuit boards (PCB). One is responsible for accurately measuring the forces exerted on the force transducers, applying noise reduction algorithms and other logical processing on them; while the other is responsible for housing a power cable, communication cable, flash memory storage, a push switch for monitoring the position of the drawer, and integration components with the solenoid and other standard features of the cash register. The two PCBs are connected via a ribbon cable to allow a good integration and communication between the two. The former PCB is located inside of the cash drawer between the cash tray and the wall, and is protected by a plastic case; it is located close to the force transducers to minimize noise and to maximize the signal from them. When the cash tray is added, it is also fully concealed by the tray, guide and cash draw, protecting it from accidental tampering by the operator. The connecting ribbon cable protrudes from the PCB and out from the rear of the cash drawer, where it can extend and fold freely as the cash drawer opens and closes. The ribbon connects to the second PCB, which is located in the rear compartment, behind the cash drawer and is fixed to the base of the cash register. A push switch protrudes from the PCB and is positioned such that it is pressed when the cash drawer is closed and released when the cash drawer is open. The PCB is also connected to the solenoid, controlling the cash drawer catch mechanism; the connection uses a transistor to monitor when the solenoid fires, which is then communicated to the other PCB for processing. A cable inlet, on the rear base of the cash register allows a USB cable, power cable, and a DSL cable access into the cash register internals. The DSL cable connects to the solenoid providing it power to fire, while the power and USB cable are connected to the rear PCB providing the system with power and the ability to communicate with external computer devices. This layout can be seen in FIG. 5.

When a cash transaction is entered at the EPoS terminal the system begins generating cash token combinations that could occur for the transaction. Simultaneously a print receipt signal is sent down a DSL cable and received by a receipt printer and the solenoid in the cash register. The solenoid fires releasing a catch mechanism, allowing a loaded spring to push the cash drawer out of the case, presenting the cash tray and token contents to the till operator. The till operator will then add the payment received from the customer to the cash tray and remove the appropriate amount of change from the tray. The drawer will then be closed by the till operator. The internal PCBs will detect the drawer closing via the push switch, and will calculate the weight applied to each force transducer. This information is communicated to the EPoS via the USB cable, and it cross-referenced against the generated cash token combinations. If no matching combinations are found, or the probability of them being correct is too low then an alert is displayed for the till operator. This process is fast enough that the till operator will still be handing the receipt to the customer; the operator can simply recount the change at this point to avoid giving incorrect change to the customer.

An alternative implementation of this invention is by incorporating the before mentioned system components into the "pop lid" cash register design. This is where rather than there being a sliding drawer that ejects out of the cash register casing presenting access to the cash tray and contents, there is instead a lid that flips up allowing access to the cases internal contents inside. The lid flipping mechanism is again controlled by a solenoid or similar locking device and is triggered in the same manner as before. The cash tray is again suspended on supporting rails that measure the force exerted on them by the weight of the tray and its contents. The general operation of the device has the same principle, although aesthetically the device looks different.

As the hardware infrastructure is already available in the cash register device several other detection systems can be implemented in parallel. These include:

Detection of the drawer being left open too long, by activating a timer on the drawer being opened and then this alert being communicated out periodically as the drawer is left open.

Detection of potential sabotage by operators, by detecting sharp or large forces being applied to the cash tray while the drawer is open.

Detection of the cash tray being removed. By using the a pre-calibrated weight of the system with no tray, and detecting that while the drawer is closed Detection of when the cash drawer is opened manually. By recording the drawer switch being triggered, and not detecting the internal solenoid firing.

Detection of the cash tray being tampered with. By detecting a fluctuating force on the cash drawer that goes on for too long.

Detection of when the USB or power is cut off to alert when potential cash register activity has occurred when the system is off line.

As an additional feature to ease with the installation of the device in a retail environment, an embedded USB Hub has been installed on the USB communication area of the electronics board, the hub splits off to flash memory, which will store the system drivers and general installation software. This enables the devices to be simply plugged into a computer and the relevant software be automatically installed ready for use.

The invention claimed is:
1. A cash drawer system comprising:
a cash tray comprising a plurality of containers, each container for holding a plurality of cash tokens;
two or more force measuring devices arranged to take force measurements about one or more suspension points of the cash tray, each force measurement being representative of the force exerted by the contents of the containers and the cash tray and for the purposes of calculating the change in contents of the cash tray; and
a processor configured to process the force measurements in order to determine the change in contents of each of the plurality of containers, the change in contents being a combination of cash tokens added to the cash tray and cash tokens removed from the cash tray for a transaction;
wherein, in order to determine the change in contents of the cash tray, the processor is configured to:
receive information about the transaction, the information including an indication of the total value of cash tokens added to the cash tray as payment, and an indication of the total value of cash tokens removed from the cash tray as change;
generate a plurality of calculated combinations of cash tokens corresponding to the total value of cash tokens added to the cash tray as payment, and the total value of cash tokens removed from the cash tray as change; and
exclude at least some of the plurality of calculated combinations based on the force measurements, in order to determine one or more possible combinations for the change in contents of the cash tray.

2. The cash drawer system of claim 1, wherein, in order to determine the change in contents of the cash tray, the processor is configured to:
determine a probability for each of the possible combinations, the probability being the likelihood that each possible combination is correct.

3. The cash drawer system of claim 1, wherein determining the change in contents of each of the plurality of containers comprises:
comparing force measurements taken before the transaction has begun and force measurements taken after the transaction has been completed.

4. The cash drawer system of claim 1, wherein each container is associated with a different value cash token.

5. The cash drawer of claim 4, wherein the mass of each value of cash token is within a predefined mass distribution, each token having a different mass distribution.

6. The cash drawer of claim 5, wherein the change in content of each container is determined based on the force measurements, the mass distribution for each value cash token, and a known position for each cash token.

7. The cash drawer system of claim 1, wherein the cash tray is constructed and arranged such that each container exerts a force at a predetermined point along an axis passing through the sensing devices.

8. The cash drawer system of claim 1, wherein the cash tray is suspended by a lever having a pivot, the cash drawer system comprising:
a first force sensing device , arranged to measure a downward force on the lever; and
a second force sensing device, arranged to measure an upward turning force on the lever.

9. The cash drawer system of any of claim 1, wherein the cash tray is suspended between a first force sensing device and a second force sensing device.

10. The cash drawer system of claim 1, wherein the cash tokens comprise coins.

11. The cash drawer system of claim 1, wherein the cash tokens comprise notes.

12. A method for determining the change in the content of a cash tray, the cash tray the comprising a plurality of containers, each container for holding a plurality of cash tokens, method comprising:
- suspending the cash tray from one or more suspension points;
- measuring the force exerted by the cash tray at the one or more suspension points of the cash tray, each force measurement being representative of the force exerted by the contents of the containers and the cash tray;
- receiving information about a cash transaction, the information including an indication of the total value of cash tokens added to the cash tray as payment, and an indication of the total value of cash tokens removed from the cash tray as change;
- generating a plurality of calculated combinations of cash tokens corresponding to the total value of cash tokens added to the cash tray as payment, and the total value of cash tokens removed from the cash tray as change; and
- excluding at least some of the plurality of calculated combinations based on the force measurements, in order to determine one or more possible combinations for the change in contents of the cash tray.

13. The method of claim 12, wherein excluding at least some of the plurality of combinations based on the force measurements comprises:
- excluding at least some of the plurality of calculated combinations based on the probability that each calculated combination will produce the total measured force.

14. The method of claim 12, comprising:
- excluding at least some of the plurality of calculated combinations based on the probability that each combination will realistically be provided by a user.

15. The method of claim 12, comprising:
- comparing force measurements before and after the content of the cash tray has changed to determine the change in the content of a cash tray.

16. The method of claim 12, comprising:
- determining a probability for each of the possible combinations, the probability being the likelihood that each possible combination is correct.

17. The method of claim 16, comprising:
- determining the possible combination with the highest probability as the change in contents of the cash tray.

18. The cash drawer of claim 1, wherein the processor is configured to:
- exclude at least some of the plurality of calculated combinations based on the probability that each calculated combination will produce the total measured force.

19. The cash drawer of claim 1, wherein the processor is configured to:
- exclude at least some of the plurality of calculated combinations based on the probability that each combination will realistically be provided by a user.

20. The cash drawer of claim 2, wherein the processor is configured to:
- determine the possible combination with the highest probability as the change in contents of the cash tray.

* * * * *